US012697620B2

(12) United States Patent
Davis et al.

(10) Patent No.: US 12,697,620 B2
(45) Date of Patent: Aug. 4, 2026

(54) THERMO-CYCLER FOR ROBOTIC LIQUID HANDLING SYSTEM

(71) Applicant: Beckman Coulter, Inc., Brea, CA (US)

(72) Inventors: Matthew S. Davis, Indianapolis, IN (US); Kristina K. Lu, Indianapolis, IN (US); Rachel Ellen Moschell, Carmel, IN (US); Peter Robert Nei, Brownsburg, IN (US); Mark F. Sauerburger, Zionsville, IN (US); Zachary M. Smith, Avon, IN (US); John S. Snider, Brownsburg, IN (US); Jason L. Springston, Carmel, IN (US)

(73) Assignee: Beckman Coulter, Inc., Brea, CA (US)

(*) Notice: Subject to any disclaimer, the term of this patent is extended or adjusted under 35 U.S.C. 154(b) by 869 days.

(21) Appl. No.: 17/787,418

(22) PCT Filed: Dec. 18, 2020

(86) PCT No.: PCT/US2020/065810
§ 371 (c)(1),
(2) Date: Jun. 20, 2022

(87) PCT Pub. No.: WO2021/127315
PCT Pub. Date: Jun. 24, 2021

(65) Prior Publication Data

US 2023/0020118 A1 Jan. 19, 2023

Related U.S. Application Data

(60) Provisional application No. 62/951,720, filed on Dec. 20, 2019.

(51) Int. Cl.
*B01L 7/00* (2006.01)
*B01L 9/06* (2006.01)

(52) U.S. Cl.
CPC .................. *B01L 7/54* (2013.01); *B01L 9/06* (2013.01); *B01L 2200/023* (2013.01);
(Continued)

(58) Field of Classification Search
CPC ........ B01L 7/54; B01L 9/06; B01L 2200/023; B01L 2200/147; B01L 2300/1822; B01L 2300/1894
See application file for complete search history.

(56) References Cited

U.S. PATENT DOCUMENTS 5,324,643 A 6/1994 Greatbatch et al.
6,015,534 A 1/2000 Atwood
(Continued)

FOREIGN PATENT DOCUMENTS

CN 2264187 Y 10/1997
CN 101065498 A 10/2007
(Continued)

OTHER PUBLICATIONS

Gen Cell Biosystems, http://cliclp.com/images/Documents_PDFs/GenCell_Biosystems_CLIC_LP_Overview_0214.pdf, Experience the Lowest Cost Library Prep With Time and Labor Savings, Feb. 1, 2014, 2 pages.
(Continued)

*Primary Examiner* — Charles Capozzi
*Assistant Examiner* — Michael Stanley Gzybowski
(74) *Attorney, Agent, or Firm* — Merchant & Gould P.C.

(57) ABSTRACT

A reaction vessel comprises a lower chamber with a first volume, and an upper chamber with a second volume greater than the first volume. A thermocycling system for heating the reaction vessel includes a lower heating zone to heat the lower chamber, an upper heating zone to heat the upper chamber, and a lid heater to heat an opening of the upper chamber. A method comprises loading a sample into a lower
(Continued)

chamber of a reaction vessel, thermocycling the lower chamber using a lower heating zone of the thermo cycler, combining an additive into the sample to produce a combination filling the lower chamber and at least partially filling an upper chamber of the reaction vessel, and incubating the upper and lower chambers using the lower heating zone and an upper heating zone. The lower and upper chambers can have different wall thicknesses to facilitate heat transfer.

16 Claims, 14 Drawing Sheets

(52) U.S. Cl.
CPC . *B01L 2200/147* (2013.01); *B01L 2300/1822* (2013.01); *B01L 2300/1894* (2013.01)

(56) References Cited

U.S. PATENT DOCUMENTS

| | | | |
|---|---|---|---|
| 6,197,572 | B1 | 3/2001 | Schneebeli |
| 6,423,536 | B1 | 7/2002 | Jovanovich et al. |
| 6,730,883 | B2 | 5/2004 | Brown et al. |
| 6,766,279 | B2 | 7/2004 | Linley et al. |
| 6,878,905 | B2 | 4/2005 | Brown et al. |
| 7,081,600 | B2 | 7/2006 | Brown et al. |
| 7,328,135 | B2 | 2/2008 | Linley et al. |
| 7,711,523 | B2 | 5/2010 | Linley et al. |
| 8,247,217 | B2 | 8/2012 | Ceremony et al. |
| 8,319,823 | B2 | 11/2012 | Chen et al. |
| 8,572,507 | B2 | 10/2013 | Abrams et al. |
| 8,784,753 | B2 | 7/2014 | Ceremony et al. |
| 8,823,770 | B2 | 9/2014 | Brunner et al. |
| 9,456,137 | B2 | 9/2016 | Brunner et al. |
| 9,492,825 | B2 | 11/2016 | Howell et al. |
| 9,505,002 | B2 | 11/2016 | Momboisse et al. |
| 9,507,809 | B2 | 11/2016 | Burdette et al. |
| 9,659,153 | B2 | 5/2017 | De La Torre-bueno |
| 2011/0220502 | A1 | 9/2011 | Selden et al. |
| 2011/0244467 | A1 | 10/2011 | Haswell |
| 2011/0303610 | A1 | 12/2011 | Udar |
| 2014/0112829 | A1 | 4/2014 | Thomas et al. |
| 2015/0056663 | A1 | 2/2015 | Tajima et al. |
| 2015/0100155 | A1 | 4/2015 | Hren et al. |
| 2015/0238920 | A1 | 8/2015 | Curran et al. |
| 2016/0086106 | A1 | 3/2016 | Desimas et al. |
| 2016/0161517 | A1 | 6/2016 | Gisler et al. |

FOREIGN PATENT DOCUMENTS

| | | | |
|---|---|---|---|
| CN | 102417902 | A | 4/2012 |
| CN | 104136596 | A | 11/2014 |
| CN | 106164651 | A | 11/2016 |
| CN | 206692625 | U | 12/2017 |
| CN | 209438625 | U | 9/2019 |
| EP | 2693218 | | 8/2016 |
| JP | 2007017441 | A | 1/2007 |
| JP | 2009030987 | A | 2/2009 |
| JP | 2016513975 | A | 5/2016 |
| JP | 2016135159 | A | 7/2016 |
| JP | 2016165305 | A | 9/2016 |
| KR | 1020130029128 | A | 3/2013 |
| WO | 2004031342 | A1 | 4/2004 |
| WO | 2012012779 | A2 | 1/2012 |
| WO | 2016090113 | | 6/2016 |
| WO | 2018057959 | | 3/2018 |
| WO | 2021127014 | | 6/2021 |

OTHER PUBLICATIONS

"International Application Serial No. PCT US2020 065810, International Search Report mailed Mar. 12, 2021", 5 pgs.

"International Application Serial No. PCT US2020 065810, Written Opinion mailed Mar. 12, 2021", 7 pgs.

THERMO-CYCLER FOR ROBOTIC LIQUID HANDLING SYSTEM

CLAIM OF PRIORITY

This patent application is a national stage application of PCT/US2020/065810, filed Dec. 18, 2020, which claims the benefit of priority to U.S. Provisional Application Ser. No. 62/951,720, filed Dec. 20, 2019, which is incorporated by reference herein in its entirety.

TECHNICAL FIELD

The present application relates generally, but not by way of limitation, to fluid handling systems, such as those that can be used in various applications to combine reagents (e.g., liquid reagents and solvents). More particularly, the present application relates to systems and methods for heating and cooling of samples using a thermo cycler module used in fluid handling systems, such as those loaded with containers of liquids for performing library constructions (e.g., libraries of DNA or RNA fragments for sequencing) using a plurality of reagents and solvents.

BACKGROUND

To perform library construction on samples using a fluid handling system, such as a liquid handler, the fluid handling system is typically set-up by an operator or user. Set-up can include loading samples, library construction reagents, and various items of labware, such as pipette-tips, plate lids, and liquid containers of various types and configurations, including reservoirs, microtiter plates, test tubes, vials, microfuge tubes, and the like. The reagents for library construction may be supplied as a kit from a vendor. As such, a typical library construction involves loading of a plurality of kit reagents onto a platform of the fluid handling system.

Processing of the library construction kits can involve selecting and mixing various reagents and liquids in the various liquid vessels in varying quantities and volumes and at varying temperatures. Typical kits can contain anywhere from approximately twelve to eighty-seven reagent containers, with an average of about twenty-eight reagent containers. The containers can vary in size, shape, and volume. Depending on the segment of the library-construction process being performed, only a subset of the library reagents is needed at any given time.

The reagents are typically mixed in a variety of different containers, vessels and vials, depending on the process to be performed. Furthermore, depending on the process to be performed, the various containers are heated to different levels for different times.

Thermo cyclers for use in processing of library construction kits are described in U.S. Pat. No. 6,730,883 to Brown et al., entitled "Flexible Heating Cover Assembly for Thermal Cycling of Samples of Biological Material."

OVERVIEW

The present inventors have recognized, among other things, that problems to be solved in performing library constructions and other sample construction processes involve the requirement of having to use a plurality of different liquid vessels for different construction processes. Not only does this require having the various vessels in stock, some of which will not be used for any given process, but also can result in inefficient thermo cycler usage. For example, a generic thermo cycler configured to heat different sized and shaped vessels cannot always heat each vessel uniformly or in the most efficient way. Typical automated thermo cyclers and corresponding PCR plates are configured to be suitable for rapid thermocycling of only small volumes, while general-purpose incubators and corresponding sample/reaction vessels are configured and adapted to be suitable for larger, often more than needed for a particular application, volumes. As such, such systems involve the potential for heat waste, inefficient operation, having to maintain multiple liquid vessel types and liquid loss due to spillage when transferring between vessels.

The present subject matter can provide solutions to these problems and other problems, such as by providing thermo cycler systems and methods that can include a universal liquid vessel and a thermo cycler having multiple heating zones or stages. The universal vessel can have a geometry that produces contiguous vessel volumes of different sizes. The walls of the different volumes can engage different heating zones of the thermo cycler. In examples, walls producing each volume can be produced to have different thickness to facilitate different heat transfer rates. As such, only a single heating device and single type of sample/reaction vessel are needed for performing a wide variety of processes and operations.

In an example, a method a method of preparing a biological sample using a robotic liquid handler having an automated thermo cycler can comprise: amplifying, using the thermo cycler of the robotic liquid handler, a nucleic acid from the biological sample in a first volume of liquid in a first reaction vessel of a first type of reaction vessel having a larger-volume upper section and a smaller-volume lower section, wherein the first volume of liquid encompasses the smaller-volume lower section but not the larger-volume upper section of the first reaction vessel; and isolating, using the robotic liquid handler, the amplified nucleic acid in a second volume of liquid in a reaction vessel of the first type of reaction vessel, wherein the second volume of liquid encompasses the larger-volume upper section and the smaller-volume lower section of the reaction vessel.

DETAILED DESCRIPTION

Figure 1:
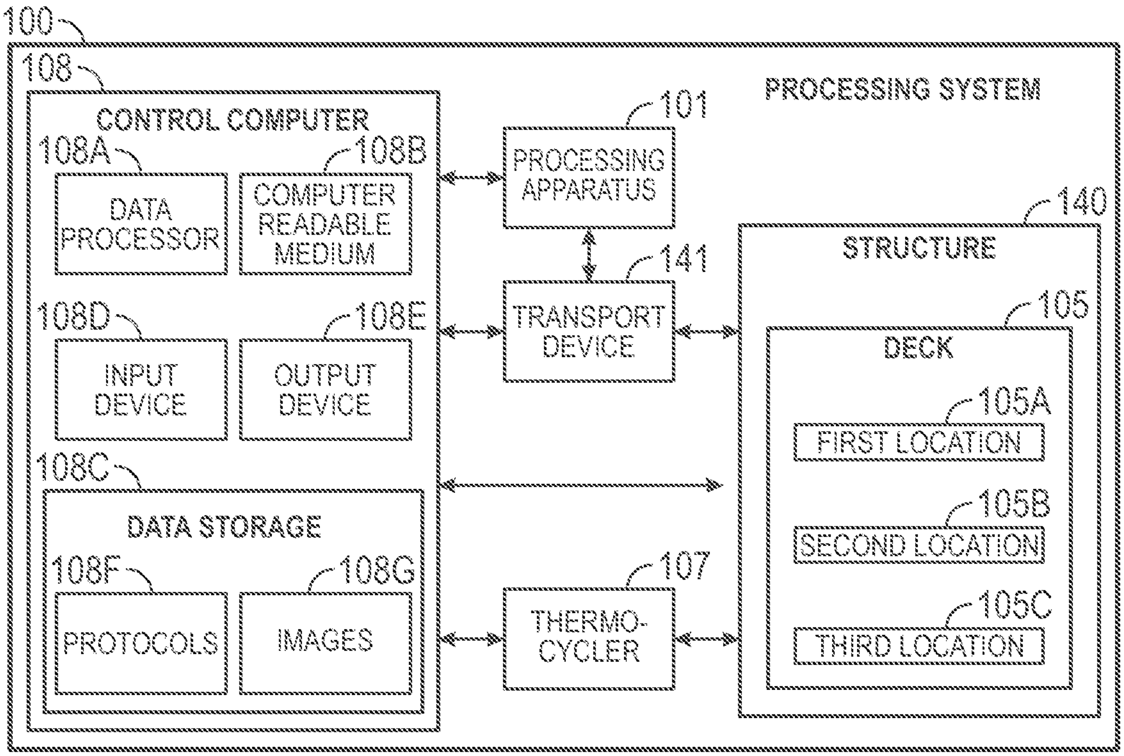
FIG. 1 is a block diagram of a fluid handling system according to an example of the present disclosure.

FIG. 1 is a high-level block diagram of processing system 100 according to an embodiment of the disclosure. Processing system 100 can comprise control computer 108 operatively coupled to structure 140, transport device 141, processing apparatus 101 and Thermo cycler system 107. Input/output interfaces may be present in each of these devices to allow for data transmission between the illustrated devices and external devices. Processing system 100 can comprise a fluid handling system as described herein. Fluids can include various liquids such as reagents and the like. An exemplary processing system in which the present disclosure can be implemented is the Biomek i7 Automated Workstation marketed by the Beckman Coulter, Inc. of Brea, California.

For explanatory purposes, processing system 100 will mainly be described as a system for processing and analyzing biological samples, such as the preparation of libraries of nucleic acid fragments (e.g., libraries of fragments derived from DNA or RNA molecules) including next-generation sequencing (NGS) libraries. For example, embodiments of the present disclosure can include thermal cycling and incubating reagents in a reaction vessel loaded into a thermocycling system, wherein the single reaction vessel and the single thermocycling system can perform a plurality of different heating functions for different liquids loaded therein.

Structure 140 can include a housing (e.g., housing 202 of FIG. 2), legs or casters to support the housing, a power source, deck 105 loadable within the housing, and any other suitable feature. Deck 105 can include a physical surface (e.g., platform 212 of FIG. 2) such as a planar physical surface upon which components can be placed and accessed for experiments, analyses, and processes. In some instances, deck 105 can be a floor or a tabletop surface. Deck 105 can be subdivided into a plurality of discrete deck locations (e.g., locations L1-L16 of FIG. 3) for placing different components. The locations can be directly adjacent or can be spaced apart from each other. Each deck location can include dividers, inserts, and/or any other support structure for separating the different deck locations and containing components. For exemplary purposes, FIG. 1 shows first location 105A, second location 105B, and third location 105C on deck 105, though additional locations can be included. One or more of locations 105A-105C can be loaded with a carousel (e.g., carousel 204 of FIG. 2) or one or more reaction vessels (e.g. reaction vessel 205 of FIG. 2) that can include spaces for holding one or more components, such as vials of liquid. Structure 140 can additionally include a motor or another device for rotating the carousel relative to deck 105 to facilitate, among other things, interaction with transport device 141, a reaction vessel and thermo cycler system 107. Furthermore, motor of structure 140, or an additional motor of structure 140, can be used to rotate individual vials loaded onto deck 105, a tray or reaction vessel loaded on deck 105 or a carousel located on deck 105.

Transport device 141, which can comprise a trolley, bridge or carriage system having moving capabilities in x and y directions and hoisting capabilities in a z direction, which can represent multiple transport devices, can prepare and/or transport components between deck 105 and processing apparatus 101, as well as between different locations on deck 105. Examples of transport devices may include conveyors, cranes, sample tracks, pick and place grippers, laboratory transport elements that can move independently (e.g., pucks, hubs or pedestals), robotic arms, and other tube or component conveying mechanisms. In some embodiments, transport device 141 includes a pipetting head configured to transfer liquids. Such a pipetting head may transfer liquids within removable pipette tips and may include grippers suitable for grasping or releasing other labware, such as microwell plates.

Processing apparatus 101 can include any number of machines or instruments for executing any suitable process. For example, processing apparatus 101 can include an analyzer, which may include any suitable instrument that is capable of analyzing a sample such as a biological sample. Examples of analyzers include spectrophotometers, luminometers, mass spectrometers, immunoanalyzers, hematology analyzers, microbiology analyzers, and/or molecular biology analyzers. In some embodiments, processing apparatus 101 can include a sample staging apparatus. A sample staging apparatus can include a sample presentment unit for receiving sample tubes with biological samples, a sample storage unit for temporarily storing sample tubes or sample retention vessels, a means or device for aliquotting a sample, such as an aliquottor, a means for holding at least one reagent pack comprising the reagents needed for an analyzer, and any other suitable features.

Figure 2:
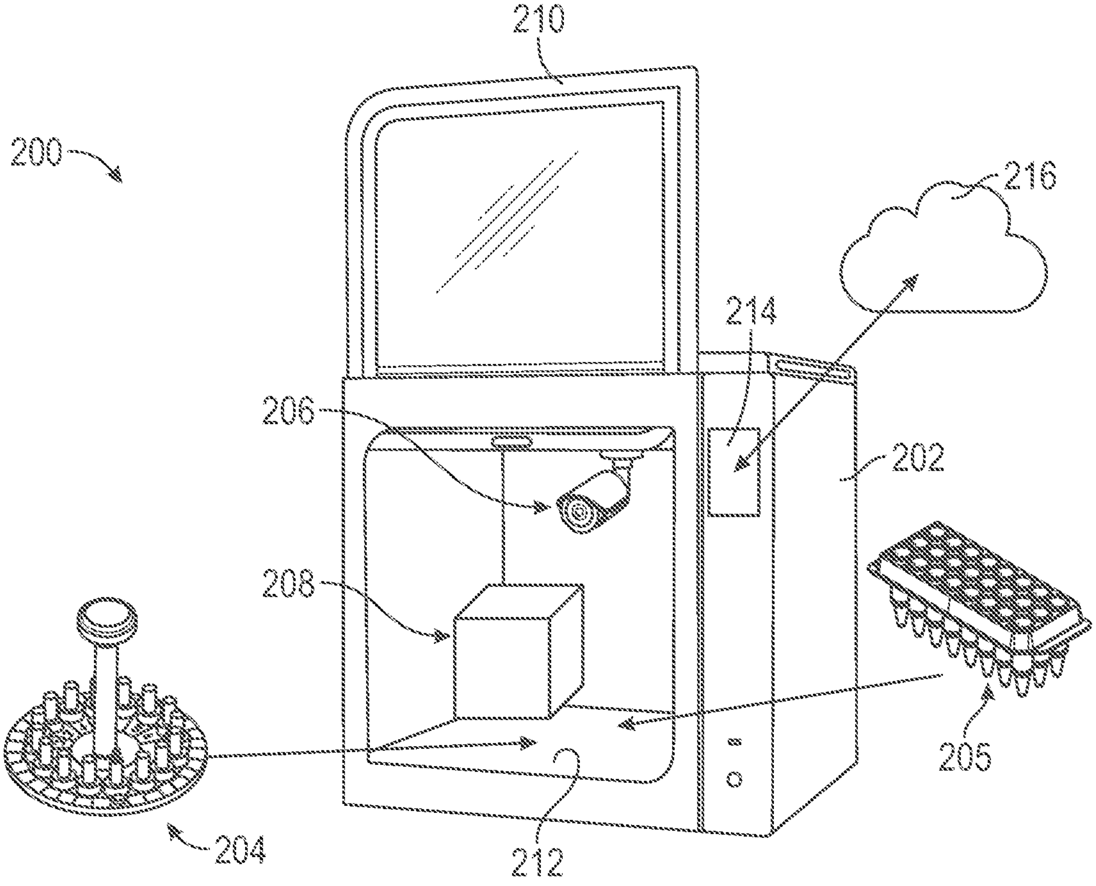
FIG. 2 is perspective view of an exemplary fluid handling system of FIG. 2 comprising a housing, a carousel, a reaction vessel, a thermal cycler module and an imaging device.

Thermo cycler system 107 can be positioned relative to deck 105 and can be configured to receive a liquid vessel, such as reaction vessel 205 (FIG. 2). Liquid vessels can be loaded manually into thermo cycler system 107 or via transport device 141. Thermo cycler system 107 can be configured to provide a plurality of different heating zones, as will be discussed below in greater detail with reference to FIGS. 3-16B, that can heat different portions of reaction vessel 205 to different temperatures. For example, thermo cycler system 107 can comprise three stacked or vertical levels of heating to provide top, middle and bottom heating zones to reaction vessel 205. Thus, for example, depending on the amount and type of liquid disposed in reaction vessel 205, different amounts of heating can be applied, such as to perform thermocycling and incubating processes.

Processing system 100 can be provided with an imaging system, e.g., a camera, to read labels of reagent vials loaded onto deck 105. The imaging system can ensure that all portions of any single reagent vial label loaded into system 100 is in view of at least one camera. Thus, for a reagent vial label that is wrapped around the circumference of a reagent vial, one or more imaging devices, with or without the use of mirrors or turntables, can have complete three-hundred-sixty-degree view of each reagent vial. The imaging device can be any suitable device for capturing an image of deck 105 and any components on deck 105 or the entirety of structure 140. The imaging device can comprise one of a plurality of imaging devices mounted to or nearby structure 140. In additional examples, multiple imaging devices can be mounted to obtain multiple views of reagent vials disposed on deck 105. For example, the imaging device can be any suitable type of camera, such as a photo camera, a video camera, a three-dimensional image camera, an infrared camera, etc. Some embodiments can also include three-dimensional laser scanners, infrared light depth-sensing technology, or other tools for creating a three-dimensional surface map of objects and/or a room. In examples, the imaging device can utilize slit-scan technology to produce panoramic images, as is known in the art. Images taken by the imaging system can be analyzed for recognition of visual indicators, e.g., numbers, text or symbols, by the fluid handling system.

Control computer 108 can control the processes run on processing system 100, initially configure the processes, and check whether a component setup has been correctly prepared for a process. Control computer 108 can control and/or transmit messages to processing apparatus 101, transport device 141, and/or thermo cycler system 107. Control computer 108 can comprise data processor 108A, non-transitory computer readable medium 108B and data storage 108C coupled to data processor 108A, one or more input devices 108D and one or more output devices 108E. Although control computer 108 is depicted as a single entity in FIG. 1, it is understood that control computer 108 may be present in a distributed system or in a cloud-based environment. Additionally, embodiments allow some or all of control computer 108, processing apparatus 101, transport device 141, and/or thermo cycler system 107 to be combined as constituent parts in a single device.

Output device 108E can comprise any suitable devices that can output data. Examples of output device 108E can include display screens, video monitors, speakers, audio and visual alarms and data transmission devices. Input device 108D can include any suitable device capable of inputting data into control computer 108. Examples of input devices can include buttons, a keyboard, a mouse, touchscreens, touch pads, microphones, video cameras and sensors (e.g., light sensor, position sensors, speed sensor, proximity sensors).

Data processor 108A can include any suitable data computation device or combination of such devices. An exemplary data processor may comprise one or more microprocessors working together to accomplish a desired function. Data processor 108A can include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Computer readable medium 108B and data storage 108C can be any suitable device or devices that can store electronic data. Examples of memories may comprise one or more memory chips, disk drives, etc. Such memories may operate using any suitable electrical, optical, and/or magnetic mode of operation.

Computer readable medium 108B can comprise code, executable by data processor 108A to perform any suitable method. For example, computer readable medium 108B can comprise code, executable by processor 108A, to cause processing system 100 to perform automated reagent processing and heating methods including mixing of various reagents within labware to different levels, heating the labware to different levels, adding additional reagents and performing additional heating using thermo cycler system 107.

Computer readable medium 108B can comprise code, executable by data processor 108A, to receive and store process steps for one or more protocols (e.g., a protocol for processing a biological sample or a protocol for a library construction process), as well as to control thermo cycler system 107, structure 140, transport device 141, and/or processing apparatus 101 to execute the process steps for the one or more protocols, such as those described with reference to the Examples section below. Computer readable medium 108B can also include code, executable by data processor 108A, for receiving results from processing apparatus 101 (e.g., results from analyzing a biological sample) and for forwarding the results or using the results for additional analysis (e.g., diagnosing a patient). Additionally, computer readable medium 108B can comprise code, executable by data processor 108A, for obtaining an image of deck 105, identifying information in the images of deck 105, deciphering information in the images using information stored in data storage 108C or computer readable medium 108B by comparing the deciphered information to information contained in protocol 108F, and loading thermo cycler system 107 accordingly.

Data storage component 108C can be internal or external to control computer 108. Data storage component 108C can include one or more memories including one or more memory chips, disk drives, etc. Data storage component 108C can also include a conventional, fault tolerant, relational, scalable, secure database such as those commercially available from Oracle™ or Sybase™. In some embodiments, data storage 108C can store protocols 108F and images 108G. Data storage component 108C can additionally include instructions for data processor 108A, including protocols. Computer readable medium 108B and data storage component 108C can comprise any suitable storage device, such as non-volatile memory, magnetic memory, flash memory, volatile memory, programmable read-only memory and the like.

Protocols 108F in data storage component 108C can include information about one or more protocols. A protocol can include information about one or more processing steps to complete, components used during the process, a component location layout, loading of thermo cycler system 107, heating levels of thermo cycler system 107 and/or any other suitable information for completing a process. For example, a protocol can include one or more ordered steps for processing a biological sample or processing a DNA library. A protocol can also include steps for preparing a list of components before starting the process. The components can be mapped to specific locations in the reaction vessel (e.g., reaction vessel 205) or in the carousel (e.g., carousel 204) where transport device 141 can obtain the components in order to transport them or the container they are loaded into to processing apparatus 101 or thermo cycler system 107. This mapping can be encoded as instructions for operating transport device 141, such as instructions directing a pipettor to aspirate a volume of liquid from a reaction vessel in the carousel and to dispense the volume at a predetermined destination, and the mapping can also be represented by a virtual image shown to a user such that the user can place the components on deck 105, the reaction vessel and the carousel. Embodiments allow processing system 100 to be used for multiple processes (e.g., multiple different sample processes or preparation procedures). Accordingly, information about multiple protocols 108F can be stored and retrieved when needed. Components on deck 105, the reaction vessels and the carousel can be rearranged, changed, and/or replenished as necessary when changing from a first process to a second process, or when re-starting a first process.

Images 108G in data storage 108C can include a real-world visual representation of deck 105, the reaction vessels and the carousel, as well as of components disposed on or in deck 105, the reaction vessels and the carousel and labels disposed on those components. In each image, deck 105, the reaction vessels and the carousel can be shown in a ready state for beginning a certain process, with components for executing a protocol placed in locations accessible to transport device 141. Each of images 108G can be associated with a specific protocol from the stored protocols 108F. In some embodiments, there can be a single image for certain protocol. In other embodiments, there can be multiple images (e.g., from different angles, with different lighting levels, or containing acceptable labware substitutions in some locations) for a certain protocol. Images 108G can be stored as various types or formats of image files including JPEG, TIFF, GIF, BMP, PNG, and/or RAW image files, as well as AVI, WMV, MOV, MP4, and/or FL V video files.

Figure 3:
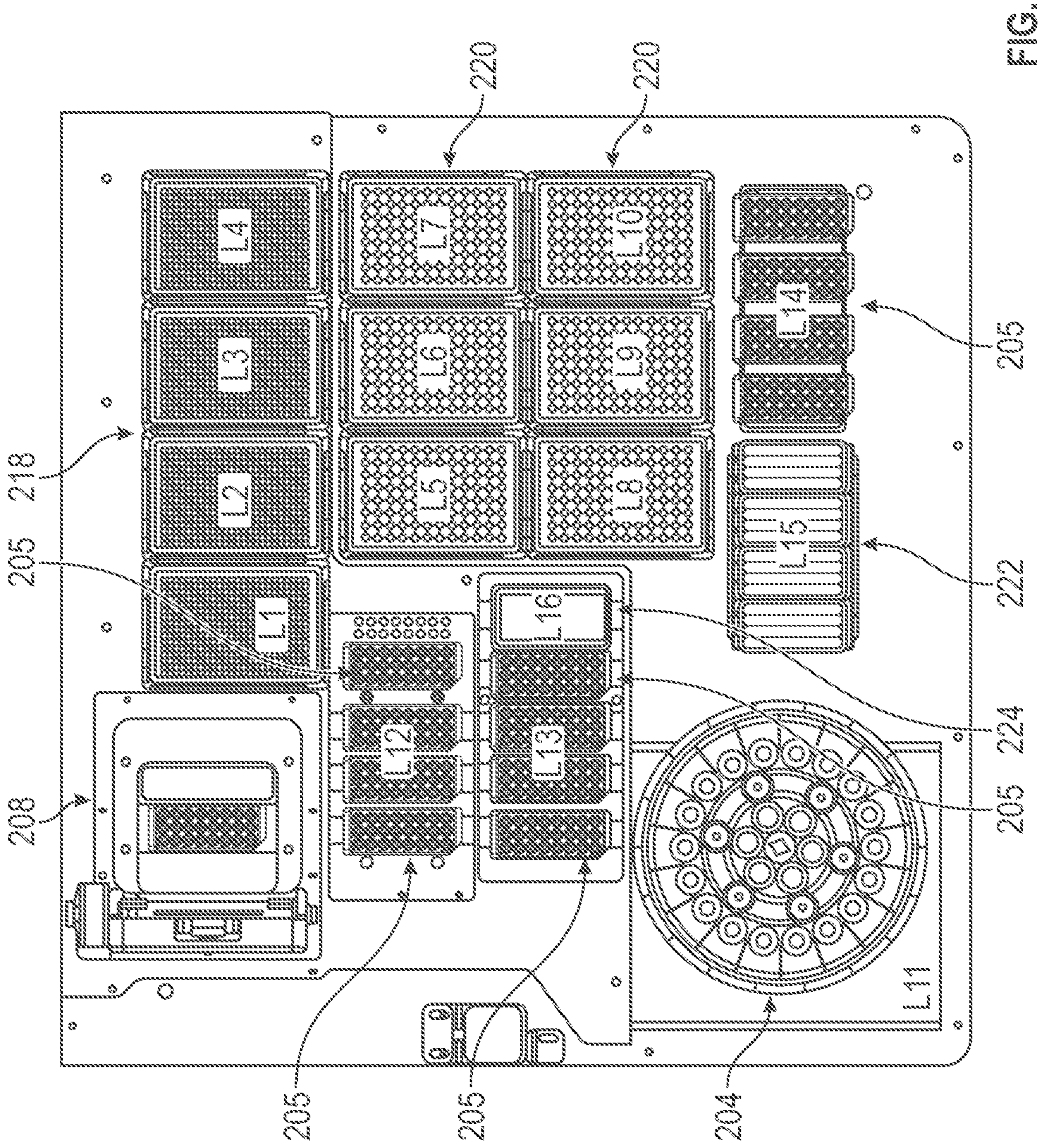
FIG. 3 is plan view of a deck for loading into the housing of FIG. 2 with spaces for various components including reaction vessels and the thermal cycler module.

Deck 105 can be subdivided into a plurality of discrete deck locations for staging different components. The discrete locations may be of any suitable size. An example of deck 105 with a plurality of locations is shown in FIG. 3. Deck 220 in FIG. 3 shows separate areas numbered L1 through L16, as well as thermal cycler 208, which can operate as a separate location for separate types of components or packages of components. Deck 105 can have additional locations or fewer locations as desired. While these locations can be numbered or named, they may or may not be physically labeled or marked on deck 105 in physical embodiments of the system.

Images, such as images 108G, can be used to verify if the proper components are loaded into deck 105, the reagent vessels, the carousel and thermo cycler system 107 for completing protocol 108F programmed into processing system 100 by an operator, and if those components are located in correct positions for executing the programmed protocol, if required by the protocol. As discussed herein, processing system 100 can thereafter execute mixing procedures for liquids loaded into reaction vessels, e.g., reaction vessel 205, and controllably heat the reaction vessel using thermo cycler system 107 in a variety of different manners depending on the liquids loaded into the reaction vessel, thereby eliminating the need for having different types and sizes of reaction vessels and different capacities and configurations of thermo cycler systems included in processing system 100.

FIG. 2 is perspective view of fluid handling system 200 that can comprise an example of processing system 100 of FIG. 2. Fluid handling system 200 can comprise housing 202, carousel 204, reaction vessel 205, imaging device 206 and thermo cycler system 208. Note, components of FIG. 2 are not necessarily drawn to scale for illustrative purposes. Housing 202 can comprise a plurality of walls or panels that form an enclosure into which carousel 204 can be positioned. The enclosure can have an opening over which cover panel 210 can be positioned to encapsulate carousel 204, imaging device 206 and thermo cycler system 208 within the enclosure. Housing 202 can additionally include platform 212 on which a deck, such as deck 105 (FIG. 1) or deck 220 (FIG. 3) can be positioned. The deck can include a slot or socket for receiving carousel 204 and one or more of reaction vessel 205. In examples, the slots or sockets can be configured to hold carousel 204 and reaction vessel 205 in a predetermined or know positions relative to imaging device 206. Platform 212 can hold the deck in a predetermined or known position relative to imaging device 206. Housing 202 can additionally comprise space for holding controller 214, such as those of control computer 108 (FIG. 1). Controller 214 can be configured to communicate with network 216, such as via a wireless or wired communication link.

Imaging device 206, which may comprise imaging device described with reference to of FIG. 1, can be located within housing 202 in a stationary location. One or more imaging devices 206 can be configured to point at a single location or multiple locations in housing 202. Simultaneously, a pipettor of transport device 141 or processing apparatus 101 (FIG. 1) can be located within housing 202 to access a location of carousel 204. Transport device 141 can additionally be configured to move reaction vessel 205 into thermo cycler system 208. Carousel 204 can spin or rotate to present different locations to the pipettor and imaging device 206. In other examples, imaging device 206 can be mounted within housing 202 to move a viewing area over different portions of the interior of housing 202.

Controller 214 can be configured to execute a protocol for components loaded into carousel 204 and reaction vessel 205 and loaded onto the deck within housing 202. In order for controller 214 to perform one or more sequences of steps on a set of vials loaded into carousel 204 and reaction vessel 205 per the protocol, controller 214 should know the location of each vial within carousel 204 and reaction vessel 205, e.g., the contents of each vial at each location within carousel 204 and reaction vessel 205. Note, reaction vessel 205 can comprise a plurality of individual elongate vessels bound together by a common structure. As discussed herein, controller 214 can be configured to operate imaging device 206 to obtain images of carousel 204 and reaction vessel 205 and components loaded therein. In particular, carousel 204 and reaction vessel 205 can be loaded with vials of material, wherein each vial can have a label that provides identifying information as to the contents of each vial, a set of vials to which each vial belongs, a manufacturer of the set of vials, one or more protocols for processing system 200 to execute with the set of vials, etc. Images of the vial labels can be read by controller 214 to recognize information presented in the labels. The information read from the labels can be compared to information, such as information obtained from network 216, stored in a computer readable medium, such as medium 108B of FIG. 1. The information stored in the computer readable medium can include a protocol for the set of vials that includes one or more sequences of steps for interacting with the set of vials, such as an order for which transport device 141 can interact with each vial, such as for moving reagents into carousal 204 and reaction vessel 205 and therebetween.

Reaction vessel 205 can be moved into thermo cycler system 208, either manually or automatically by transport device 141. Controller 214 can operate thermo cycler system 208 to execute or partially execute various protocols and protocol steps. Controller 214 can operate thermo cycler system 208 and transport device 141 to heat liquid vessels, such as reaction vessel 205, loaded into thermo cycler system 208. Thermo cycler system 208 can comprise a plurality of heating zones and reaction vessel can have a geometry forming a plurality of different shaped storage volumes, that each can have a different wall thickness for interacting with the heating zones. As such, a single thermo cycler system 208 and a single reaction vessel 205 can be used to perform a large quantity of procedures using the different combinations of heating zones and storage volumes without the need for additional equipment or reaction vessels, such as those described in the Examples section below.

FIG. 3 is plan view of deck 220 for loading onto platform 212 of housing 202 of FIG. 2. Deck 220 can include spaces or locations for various components, including carousel 204. Imaging device 206 can be mounted within housing 202 relative to platform 212 such that imaging device can produce a field of view that covers all of platform 212. However, in various examples, the field of view can be configured to cover only portions of platform 212 and multiple imaging device can be used or an articulating imaging device can be used that can move the field of view across platform 212 to different locations to achieve total coverage. Likewise, a transport system, such as transport device 141 of FIG. 1, can be configured to reach the entirety of platform 212.

FIG. 3 shows deck 220 including locations numbered L1-L16, as well as other components such as thermo cycler system 208, which can operate as a separate location for separate types of components or packages of components. Examples of deck 220 can have additional locations or fewer locations, as desired. While these locations can be numbered or named, the locations may or may not be physically labeled or marked on deck 220 in physical embodiments of fluid handling system 200. In examples of fluid handling system 200, some or all of the locations can be occupied by a pre-defined type of component according to a certain protocol. For example, locations L1-L4 can comprise storage locations for pipette tip racks 218 and location L5-L10 can comprise storage locations for millitip racks 220 that can be loaded with a component of a package or reagent kit or a component as specified by a protocol, and location L11 can be loaded with carousel 204. Racks 218 and 220 can comprise instances of reaction vessel 205. Location L12 can comprise a cold reagent storage area for reaction vessels 205. Location L13 can comprise a warm reagent storage area for reaction vessels 205. Location L15 can comprise a storage area for bulk reservoirs 222. Location L14 can comprise an RV stack storage area for reaction vessels 205. Location L16 can comprise a waste storage area for bin 224. Some of locations L1-L16 can include the same type of component. The components can comprise test tubes, microwell or microtiter plates, pipette tips, plate-lids, reservoirs or any other suitable labware component. The components can also comprise an item of laboratory equipment, such as a shaker, stirrer, mixer, temperature-incubator, vacuum manifold, magnetic plate, thermo cycler, or the like. In examples, one or more locations can be physically part of structure 140 (FIG. 1), housing 202 (FIG. 2) or deck 220 (FIG. 3), or can be a separate component disposed on platform 212. Each of locations L1-L16 can be accessed by transport device 141 (FIG. 1). For example, locations L1-L16, and thermal cycler 224 can be physically separate from structure 140 or deck 220.

Imaging device 206 can be configured to recognize the presence of one or more components at each of locations L1-L16 the presence of carousel 204 at location L11 and the presence of reaction vessel 205 at locations L12, L13 and L14, for example. Furthermore, imaging device 206 can be configured to read information from the one or more components located at each of locations L1-L16. Components, e.g., vials of liquid, can be loaded into carousel 204 is a desired manner, e.g., according to a protocol and liquid therefrom, or another location, can be loaded into one of reaction vessels 205 for loading into thermo cycler system 208 according to the protocol. Images of reaction vessel 205 taken by imaging device 206 can be used to read information from labels of vials loaded into reaction vessel 205. Thereafter, thermo cycler system 208 can executing a heating method, such as those discussed with reference to the Examples section below, to heat the liquid loaded into reaction vessel 205 according to the protocol.

Figure 4:
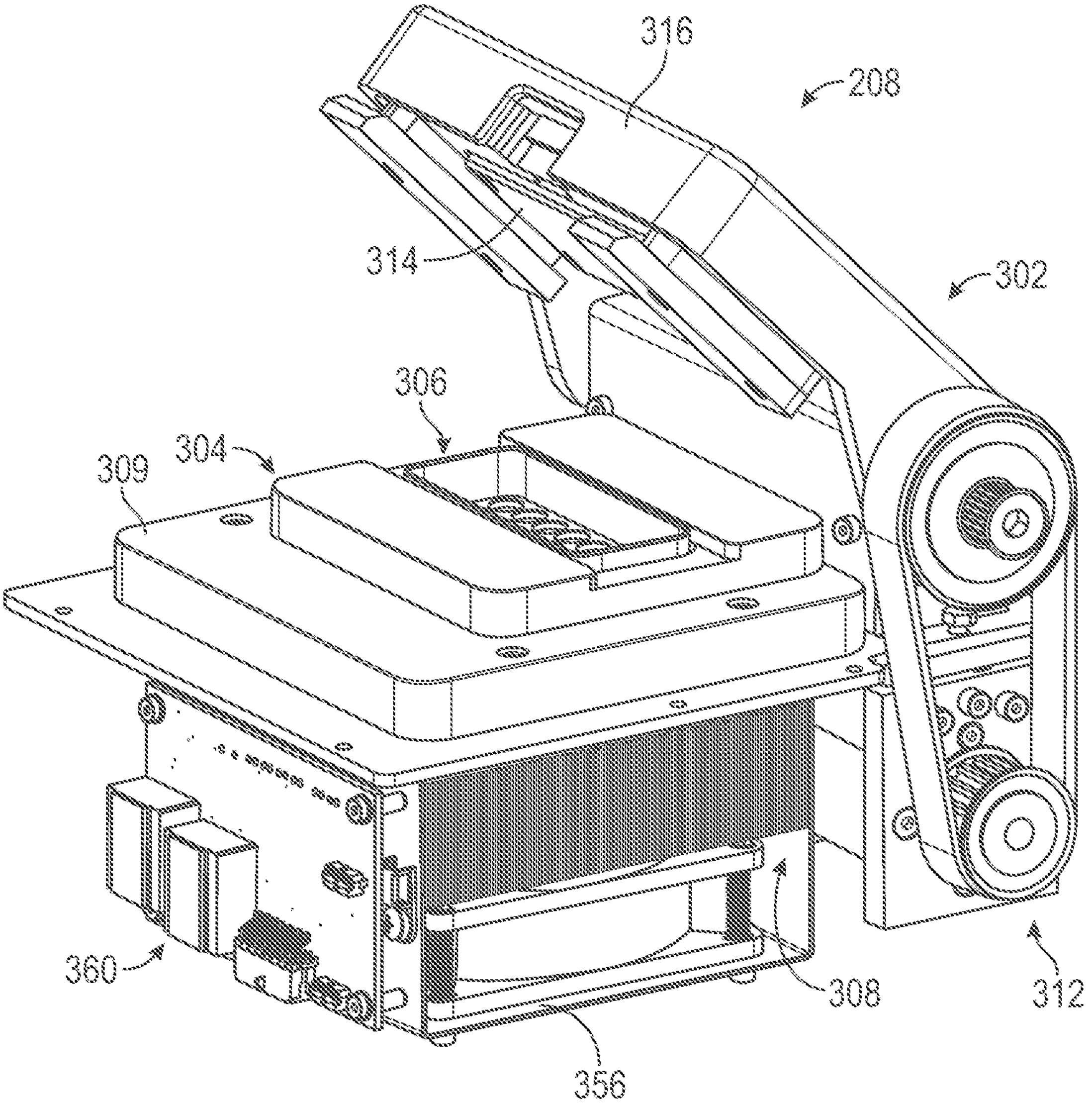
FIG. 4 is perspective view of the thermo cycler module of FIG. 3.
Figure 8:
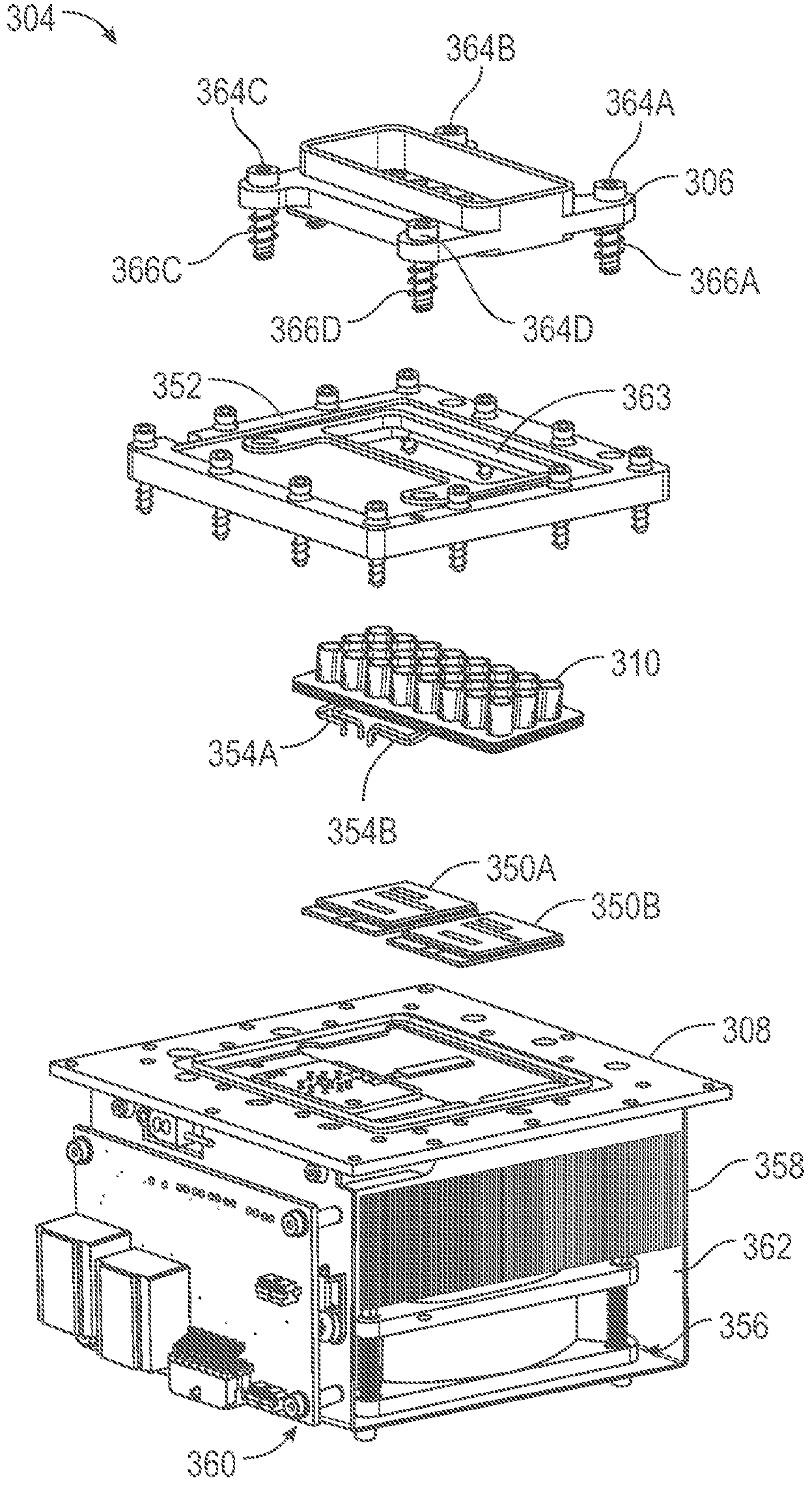
FIG. 8 is an exploded view of the thermal cycling module of FIG. 7 showing an incubation heat block, a thermal cycler heat block and a heat sink.

FIG. 4 is a perspective view of the thermo cycler system 208 of FIGS. 2 and 3. Thermo cycler system 208 can comprise heated lid 302 and thermal cycling module 304. Thermal cycling module 304 can comprise incubation heat block 306, heat sink 308, bezel 309 and thermal cycler heat block 310 (FIG. 8). Heated lid 302 can comprise lid drive system 312, heater platen 314 and lid 316.

Thermo cycler system 208 can be configured to provide a plurality of heating zones that can be used to heat reaction vessel 205 (FIG. 2) in a number of different configurations. Lid drive system 312 can be used to open lid 316 to provide access to incubation heat block 306. Reaction vessel 205 (FIG. 2) can be filled with liquids, such as reagents, stored on deck 220 using transport device 141. Reaction vessel 205 can then be loaded into incubation heat block 306, such as by using transport device 141, and can extend therethrough to contact thermal cycler heat block 310. Incubation heat block 306 and thermal cycler heat block 310 can be used to apply two different heated components to two different locations on reaction vessel 205. Furthermore, heated lid 302 can be moved by lid drive module 312 to apply a third heated component, heater platen 314, to reaction vessel 205 at a third location. Heat sink 308 can be used to conduct heat away from other components of thermo cycler system 208 and absorb excess heat. Heat sink 308 can also be used to apply cooling to reaction vessel 205, such as by using a fan to draw heat away from incubation heat block 306 and thermal cycler heat block 310. Reaction vessel 205 (FIG. 2) can be configured to interact with each of the heat zones in a different manner, such as by including different wall thicknesses or different cross-sectional areas (e.g., diameters) to facilitate different heat transfer rates. As such, heater platen 314, incubation heat block 306 and thermal cycler heat block 310 can be operated together, separately or in different combinations to heat different portions of reaction vessel 205 in different manners, depending on the liquids or reagents loaded into reaction vessel 205.

Figure 5:
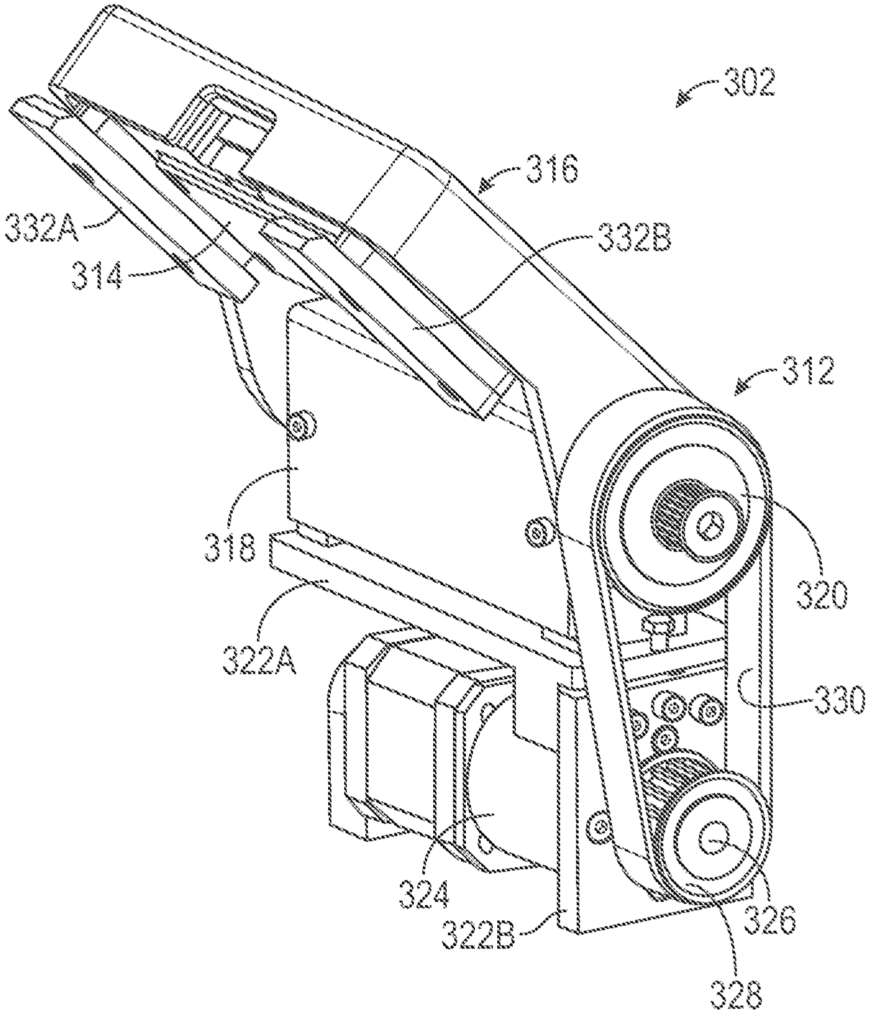
FIG. 5 is a perspective view of a heated lid assembly for the thermo cycler module of FIG. 4 including a drive module for lifting a lid.
Figure 6:
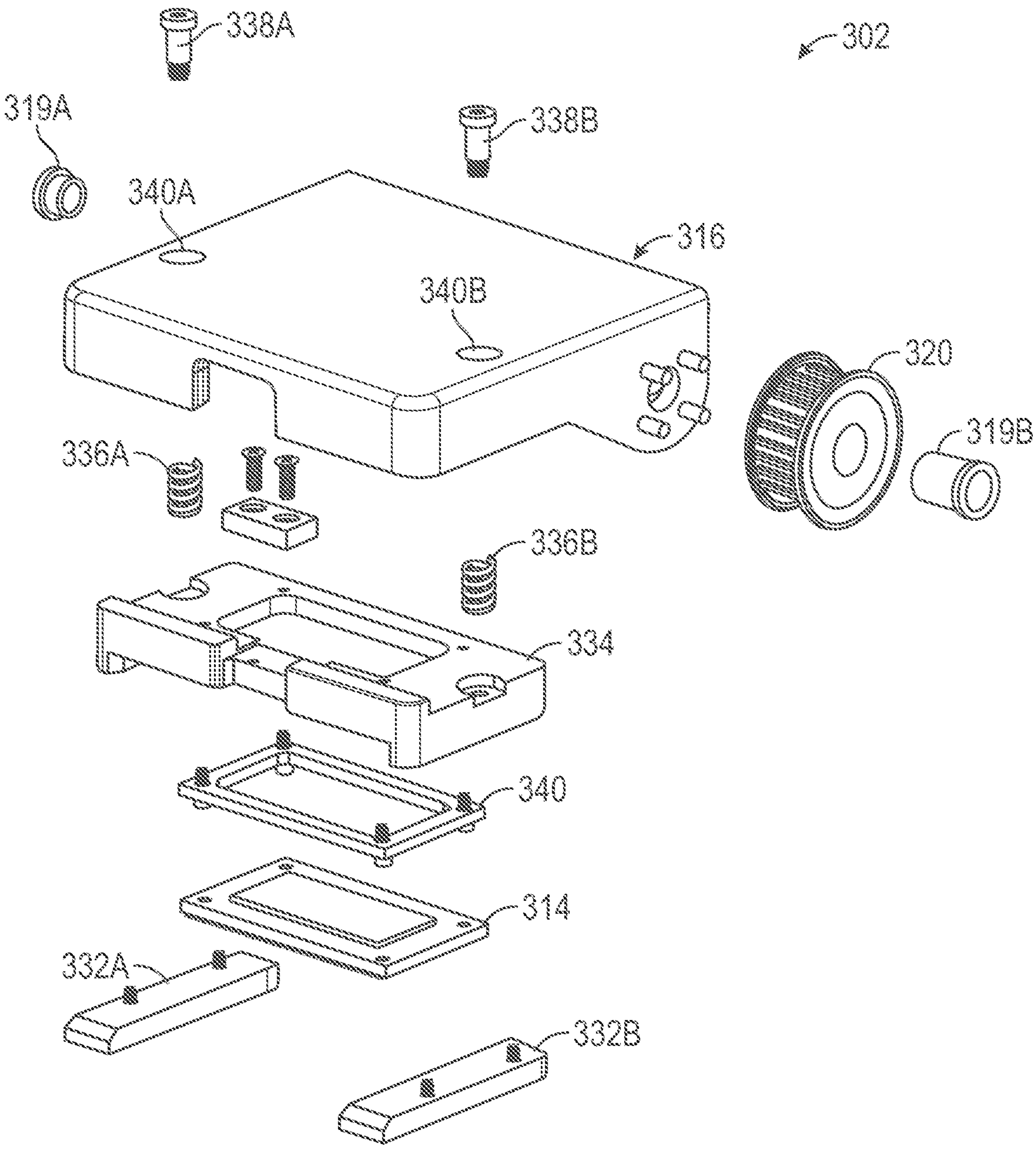
FIG. 6 is an exploded perspective view of the heated lid assembly of FIG. 5.

FIG. 5 is a perspective view of heated lid 302 for thermo cycler module 208 of FIG. 4 including drive module 312 for lifting heater platen 314 and lid 316. FIG. 6 is an exploded perspective view of heated lid 302 of FIG. 5. FIGS. 5 and 6 are discussed concurrently.

Figure 15:
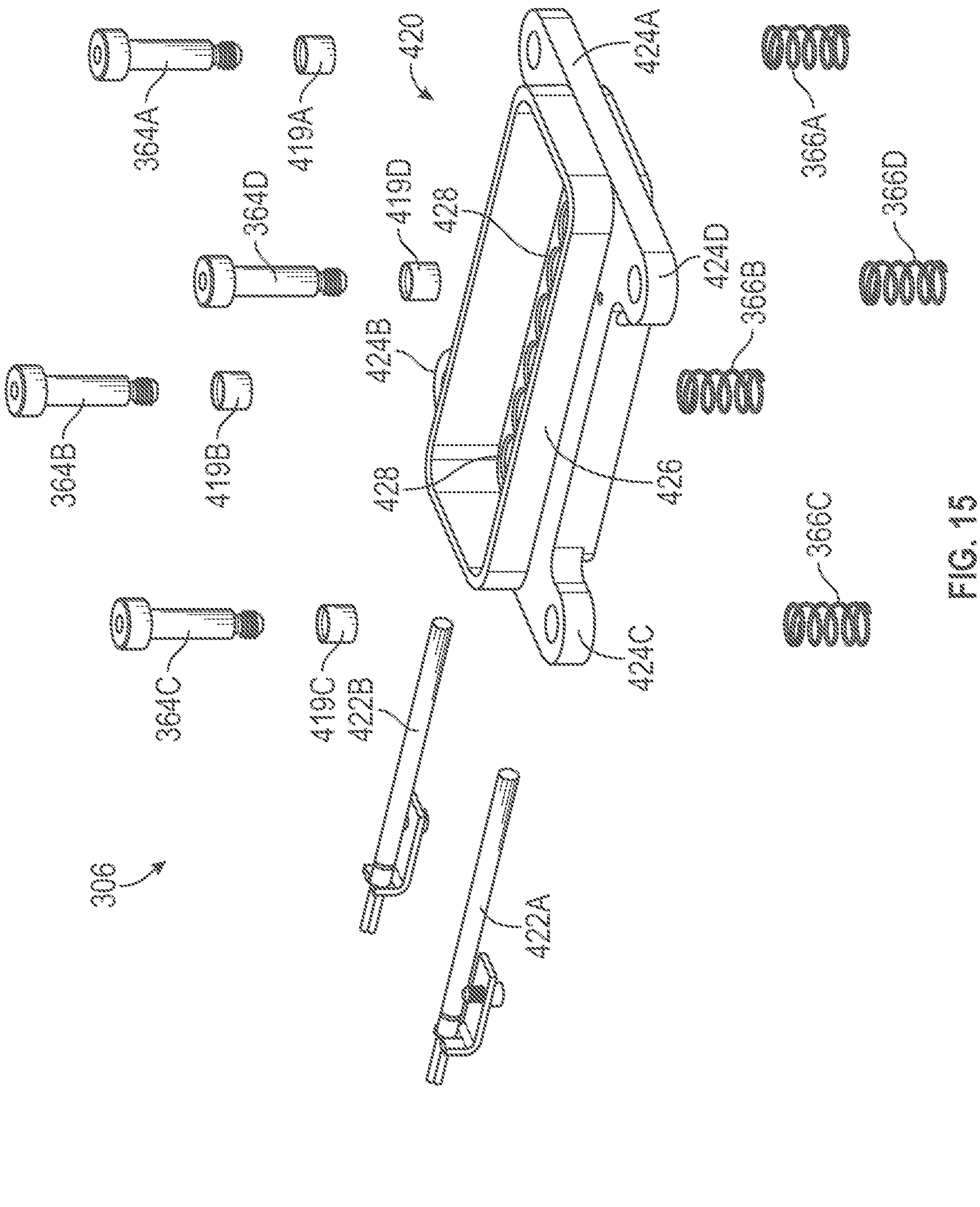
FIG. 15 is an exploded perspective view of the incubation heat block of FIG. 8.

Lid 316 can be pivotably mounted to housing 318 via bushings 319A and 319B. First pulley 320 can be fixedly coupled to lid 316 at bushing 319B such that rotation between lid 316 and first pulley 320 is not permitted. Housing 318 can be mounted to support structure 322A, which can be coupled to housing 202 (FIG. 2) of fluid handling system 200. Motor 324 can also be mounted to housing 202 such that shaft 326 extends through support structure 322B. Support structures 322A and 322B can be adjustable relative to each other to adjust tension in belt 330. Second pulley 328 can be coupled to shaft 326. First pulley 320 and second pulley 328 can be coupled via belt 330. Motor 324 can comprise a stepper motor that can provide motive input to second pulley and can additionally provide a holding force to hold lid 316 against incubation heat block 306 (FIG. 4), e.g., to compress springs 366A-366D (FIGS. 8 and 15). Belt 330 can comprise a timing belt. As such, rotational output of shaft 326 provided by motor 324 can be transferred from second pulley 328 to first pulley 320 via belt 330. Rotation of first pulley 320 can cause pivoting of lid 316 against housing 318 on bushings 319A and 319B. Motor 324 can thus be operated to move lid 316 from an open position, e.g., extending parallel to a line connecting the centers of rotation for first pulley 320 and second pulley 328, to a closed position, e.g., extending perpendicular to a line connecting the centers of rotation for first pulley 320 and second pulley 328.

Figure 7:
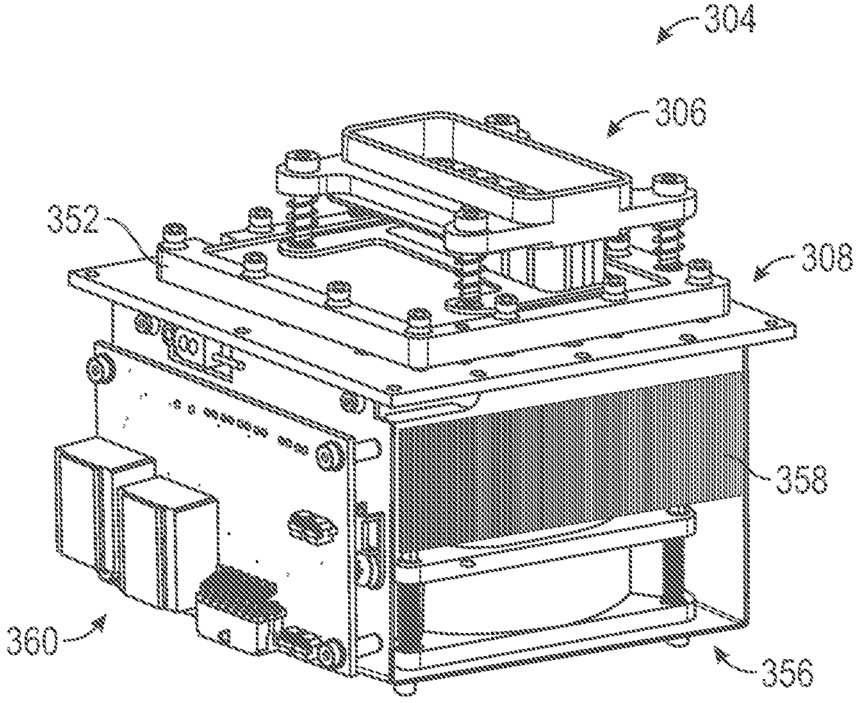
FIG. 7 is a perspective view of a thermal cycling module for use in the thermo cycler system of FIG. 4.

Lid 316 can comprise a structure for covering incubation heat block 306 (FIG. 4). Heater platen 314 can be positioned on an interior surface of lid 316 to engage reaction vessel 205. Heater platen 314 can comprise a thermofoil heater, which can be monitored by a thermistor and controlled by power board 360 (FIGS. 4 and 7). As discussed with reference to FIGS. 16A and 16B, heater platen 314 can be mounted to lid 316 via seal carrier 334 that is gimbal-mounted to lid 316. Heater platen 314 can be spring-loaded away from lid 316 such that springs 336A and 336B can be used to apply force to push heater platen 314 against incubation heat block 306. Fasteners 338A and 338B can be inserted into through bores 340A and 340B in lid 316 to engage carrier 334. Springs 336A and 3236B can be positioned around fasteners 338A and 338B, respectively, to bias carrier 334 away from lid 316. As such, carrier 334 can be configured to float relative to lid 316. As mentioned, heater platen 314 can provide one of three heating zones for reaction vessel 205, particularly configured to heat the upper or open ends of liquid containers of reaction vessel 205 to, for example, prevent condensation forming therein during thermal cycling and incubation processes.

Lid 316 can also include seal slides 332A and 332B that can engage bezel 309 (FIGS. 7 and 8) on thermal cycling system 304 (FIG. 4). Heater platen 314 can be mounted to lid 316 via insulator 340. Seal slides 332A and 332B can be configured to align heater platen 314 parallel to bezel 309 and the top plane of incubation heat block 306.

FIG. 7 is a perspective view of thermal cycling module 304 for use in thermo cycler system 208 of FIG. 4 with bezel 309 removed. FIG. 8 is an exploded view of thermal cycling module 304 of FIG. 7 showing incubation heat block 306, heat sink 308, thermal cycler heat block 310, heating elements 350A and 350B (FIG. 8), compression plate 352, heat sensors 354A and 354B, fan 356, fan shroud 358 and power board 360. FIGS. 7 and 8 are discussed concurrently.

Thermal cycling module 304 can include housing 362 that can be mounted to housing 202 (FIG. 2) of fluid handling system 200. Fan 356 can be mounted at the bottom of housing 362 and can be configured to move air into or out of housing 362 to, for example, provide cooling functionality. Fan shroud 358 can be located in housing 262 to direct airflow through housing 362. Power board 360 can also be attached to housing 362 and can be configured to manage power supplied to fan 356, thermal cycler heat block 310 and incubation heat block 306 and movable lid 302. Power board 360 can include components for connecting to motor 324, fan 356, heating elements 422A and 422B, heating elements 350A and 350B and heater platen 314. Power board 360 can be coupled to control computer 108 (FIG. 1) to coordinate operation of thermo cycler system 208 with execution of the protocols discussed herein.

Compression plate 352 can be coupled to housing 362 of heat sink 308 and can be used to provide a socket for thermal cycler heat block 310 via window 363. Seals can be positioned between compression plate 352 and thermal cycler heat block 310 and between compression plate 352 and housing 362 to prevent condensation and other liquids, such as spilled reagents, from contacting heating elements 350A and 350B. Incubation heat block 306 can be configured to float relative to compression plate 352 via fasteners 364A-364D. Springs 366A-366D can be positioned around fasteners 364A —364D, respectively, and between incubation heat block 306 and compression plate 352. As such, springs 366A-366D can bias incubation heat block 306 away from compression plate 352.

Heating elements 350A and 350B can comprise Peltier driven thermal cycling heat blocks. Heat sensors 354A and 354B can comprise thermistors. Heat sensors 354A and 354B can be configured as redundant sensors to monitor for potential sensor drift and overheating conditions. Heating elements 350A and 350B and heat sensors 354A and 354B can be connected to power board 360 to facilitate control and operation of thermo cycler system 208. As mentioned, heating elements 350A and 350B can provide one of three heating zones for reaction vessel 205, particularly configured to heat the lower or closed ends of liquid containers of reaction vessel 205.

Figure 9:
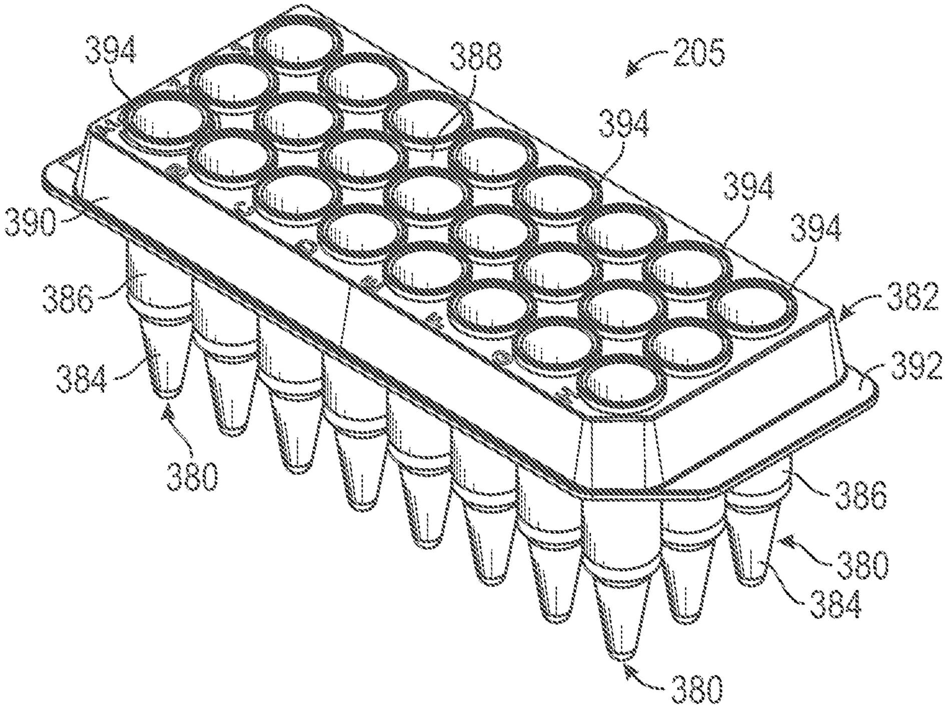
FIGS. 9 and 10 are perspective and top views of a reaction vessel for use with the thermal cycling module of FIGS. 7 and 8.
Figure 10:
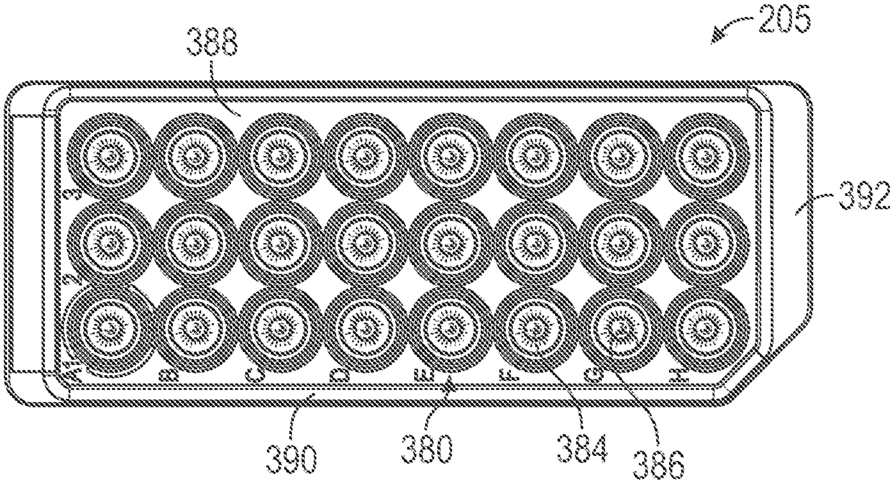

FIGS. 9 and 10 are perspective and top views of reaction vessel 205 for use with the thermal cycling module 304 of FIGS. 7 and 8. Reaction vessel 205 can comprise a plurality of vessels 380 for holding liquids to be processed by processing system 100. In the illustrated example, reaction vessel 205 comprises twenty-four vessels 380 arranged in three rows of eight. Vessels 380 can be connected via frame 382. Each vessel 380 can comprise lower chamber 384 and upper chamber 386. Frame 382 can comprise end wall 388, sidewall 390 and rim 392. Upper chambers 386 can extend through end wall 388 such that end wall 388 can include openings or sockets to receive upper chambers 386. A portion of upper chambers 386 can extend beyond, e.g., above, end wall 388 to form flanges 394. Sidewall 390 and rim 392 can provide flat surfaces for including of labels, such as bar codes, for identification by the imaging system of processing system 100, such as imaging device 206. Labels can be provided as stickers, etchings, molded indicia and the like. Reaction vessel 205 can be provided with lids to prevent spilling and evaporation. The lids can attach to rim 392 and can be transparent to allow viewing of labels on sidewall 390. One of both of sidewall 390 and rim 392 can also facilitate interaction with a gripper of transport device 141 and stacking of multiple reaction vessels 205 on top of each other.

In examples, reaction vessel 205 can be made as a single monolithic component of uniform material composition made during a single manufacturing process. In additional examples, each of vessels 380 can be made as a separate component and attached to frame 382. In examples, reaction vessel 205 can be made transparent material. In additional examples, vessels 380 can be made of polypropylene to provide chemical compatibility and frame 382 can be made of polycarbonate to provide strength and resistance to heat deformation.

Figure 14:
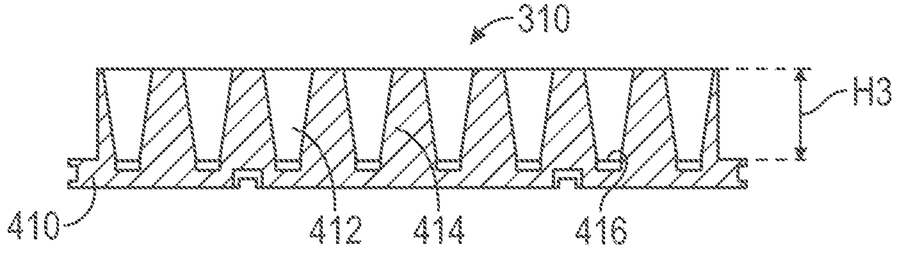
FIG. 14 is a cross-sectional view of the thermal cycler heat block of FIG. 13.
Figure 16A:
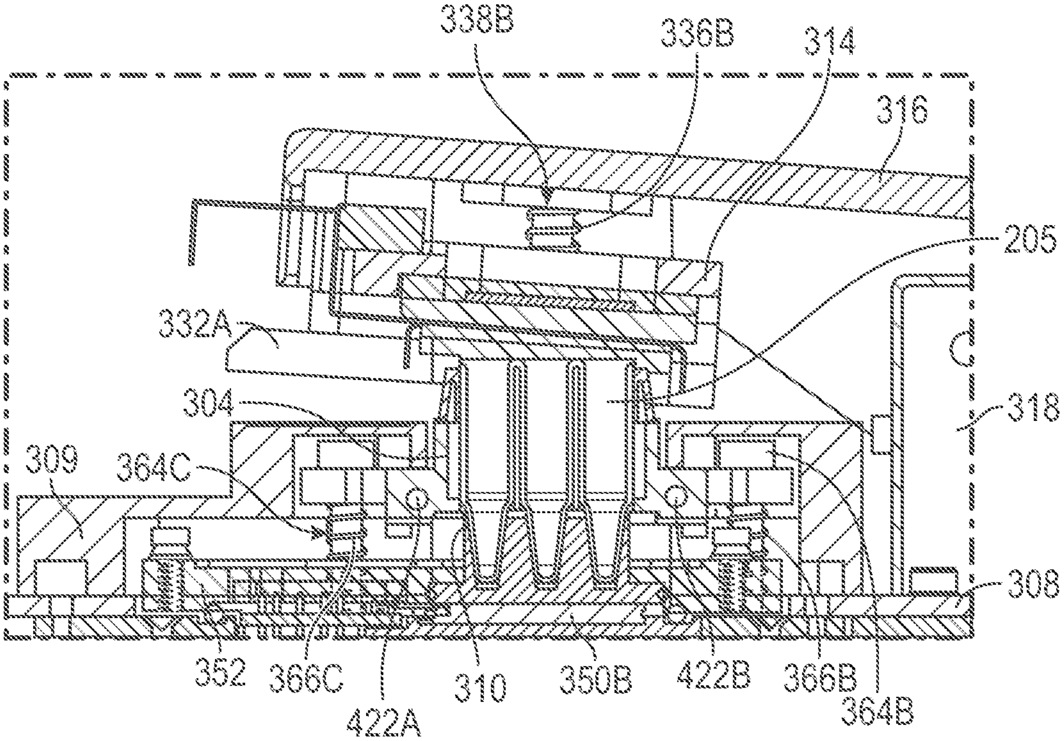
FIG. 16A is a cross-sectional view of the thermal cycler module of FIG. 4 with the heated lid partially open.
Figure 16B:
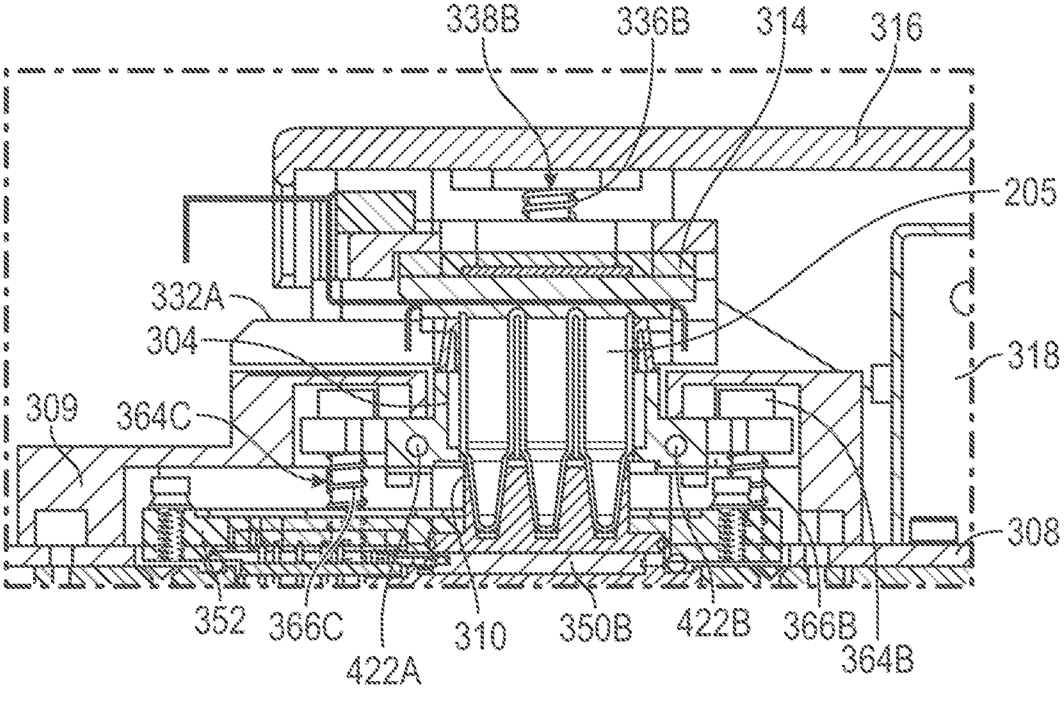
FIG. 16B is a cross-sectional view of the thermal cycler module of FIG. 4 with the heated lid fully closed.

Lower chamber 384 can comprise a first volume for holding the initial or first deposit of liquids or materials within vessel 380. Lower chamber 384 can be shaped to fit within a receptacle of a heating block. In particular, lower chamber 384 can be tapered to fit within thermal cycler heat block 310, as can be seen in FIG. 14. Upper chamber 386 can comprise a second volume for holding subsequent or a second deposit of liquid or materials within vessel 380 after lower chamber 384 is filled. Upper chamber 386 can be shaped to fit within a receptacle of a heating block. In particular, upper chamber 386 can be cylindrical to fit within incubation heat block 306, as can be seen in FIGS. 16A and 16B.

As can be seen in FIG. 10, vessels 380 can have circular cross-sectional profiles, with upper chambers 386 being larger in diameter than lower chambers 384. Such configuration facilitates insertion and removal from incubation heat block 306 and thermal cycler heat block 310. Additionally, such configuration also facilitates insertion of instruments into vessels 380 with reduced risk of becoming snagged and facilitates application of magnets within vessels 380 (See FIG. 17.).

Figure 11:
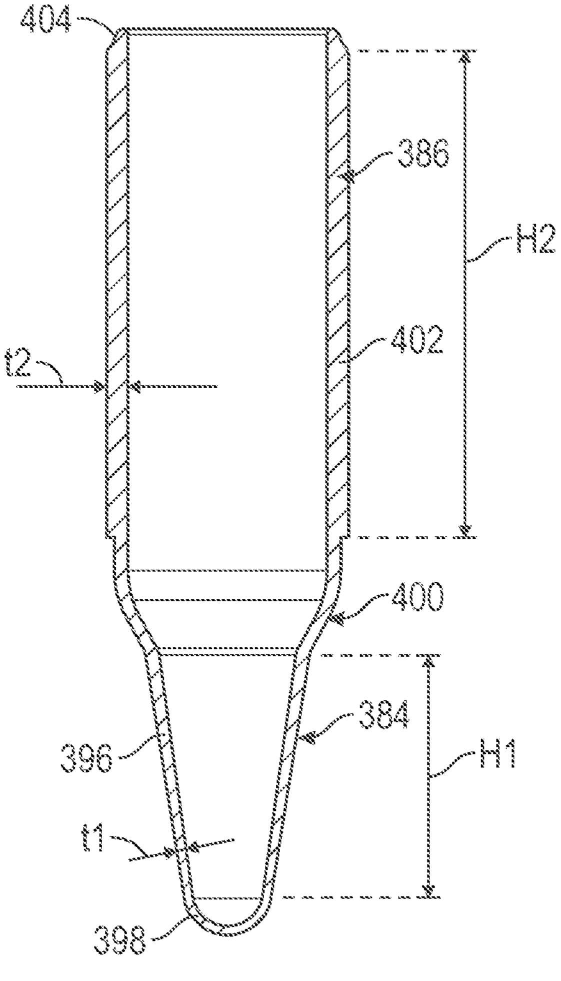
FIG. 11 is a cross-sectional view of the reaction vessel of FIG. 9 showing lower and upper chambers.

FIG. 11 is a cross-sectional view of reaction vessel 205 of FIG. 9 showing lower chamber 384 and upper chamber 386. Lower chamber 384 can be formed by conical wall 396 that can extend from lower bowl 398 upward to taper 400. Upper chamber 386 can be formed by cylindrical wall 402 that can extend from taper 400 to lip 404 (e.g., flange 394). Conical wall 396 can have first thickness t1 and cylindrical wall 402 can have second thickness t2. First thickness t1 can be less than second thickness t2. First thickness t1 can be thin to minimize thermal resistance when placed in thermal cycling block 310. Conical wall 396 can have height H1 and cylindrical wall 402 can have height H2. Height H2 can be greater than height H1.

Reaction vessel 205 can be configured such that lower chamber 384 provides a thermal cycling zone and upper chamber 386 provides an incubation zone, wherein thermo-cycling involves rapid bursts of heating and/or cooling between two elevated temperatures, such as 4° C. and 98° C., and incubation involves steady heating within a wide range of temperatures for longer periods of time, such as 25° C. and 110° C. In additional examples, thermal cycling module 304 can include a cooling element to cool upper chamber 386 and/or other sections of reaction vessel 205, to temperatures below ambient temperature. In an example, a cooling device can comprise a Peltier device or a fan. As such, first thickness t1 can be thin to facilitate thermal cycling and second thickness t2 can be thick to facilitate incubation. In an example, vessel 380 can be configured to hold a maximum of 1000 μL, with lower chamber 384 being configured to hold approximately 100 μL and upper chamber 386 being configured to hold approximately 900 μL maximum. However, upper chamber 386 can be configured to incubate approximately 800 μL during a typical operation, with excess capacity being provided to prevent spillage and the like.

The shape and design of reaction vessel 205 is helpful in facilitating the performance of a variety of different processes with only a single vessel type, either with only one instance of reaction vessel 205 or a plurality of reaction vessels 205. For example, reaction vessel 205 can be used in a variety of nucleic acid (NA) sample preparation processes, such as NA extraction, NA isolation, NA fragmentation, NA size-selection, NA end-processing, adapter ligation, NA amplification, and post-amplification clean-up. In some embodiments, each step in a multi-step method/protocol/process/workflow can be performed in the same type of reaction vessel, e.g., reaction vessel 205, eliminating the need to maintain a supply and a deck space for different types of plates. In an embodiment, sequential reactions/steps can be performed in the same reaction vessel, such as polymerase chain reaction (PCR) amplification followed by isolation of the amplified product by binding and eluting to magnetic beads. Furthermore, by using fewer or only one reaction vessel, the amount of transferring between reaction vessels is reduced, which correspondingly reduces the amount or volume of liquid and nucleic acid contained therein from being lost or left behind in a previously used reaction vessel.

Figure 12:
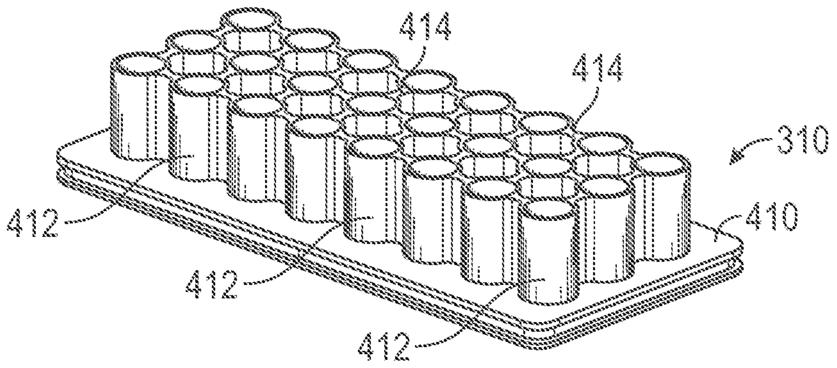
FIGS. 12 and 13 are perspective and top views of the thermal cycler heat block of FIG. 8.
Figure 13:
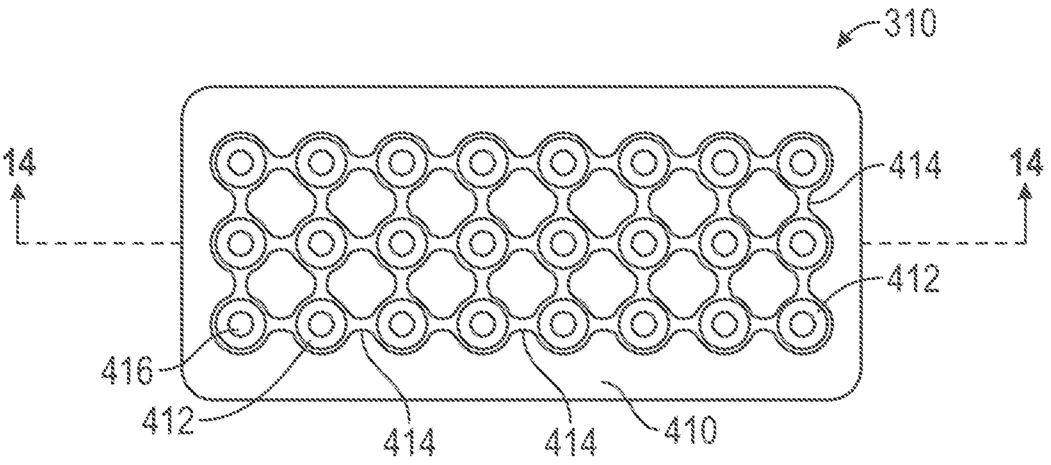

FIGS. 12 and 13 are perspective and top views of thermal cycler heat block 310 of FIG. 8. FIG. 14 is a cross-sectional view of thermal cycler heat block 310 of FIG. 13. FIGS. 12-14 are discussed concurrently. Thermal cycler heat block 310 can comprise base plate 410, sockets 412 and webs 414. Base plate 410 can comprise a flat body configured to mount within window 363 of compression plate 352 (FIG. 8). Sockets 412 can comprise circular receptacles into which lower chambers 384 of reaction vessel 205 can fit. As such, sockets 412 can comprise conical walls configured to mate flush with conical wall 396 (FIG. 11). Webs 414 can connect the conical walls of sockets 412 such that voids 413 are produced in thermal cycler heat block 310, thereby increasing thermal efficiency by removing excess mass. Sockets 412 can have height H3 that can be approximately equal to height H1 of conical wall 396. Thus, lower bowls 398 of lower chambers 384 can rest on floors 416 of sockets 412 and conical walls 396 can extend to the top of sockets 412 such that taper 400 (FIG. 11) is positioned above thermal cycler heat block 310. Thermal cycler heat block 310 can be fabricated from a material having high strength and heat transfer characteristics, such as nickel plated 6061-T6 aluminum. Some or all of thermal cycler heat block 310 can be coated, such as with polytetrafluoroethylene (PTFE), to reduce sticking of reaction vessel 205 thereto.

FIG. 15 is an exploded perspective view of incubation heat block 306 of FIG. 8. Incubation heat block 306 can comprise fasteners 364A-364D, springs 366A-366D, closure members 419A-419D, heater block 420 and heating elements 422A and 422B. Heater block 420 can comprise flanges 424A-424D, sidewall 426 and sockets 428. Heater block 420 can be fabricated from a material having high strength and heat transfer characteristics, such as nickel plated 6061-T6 aluminum.

Fasteners 364A-364D can extend through bores in flanges 424A-424D and threaded ends of fasteners 364A-364D can extend into compression plate 352. Closure members 419A-419D, e.g., threaded nuts or bushings, can attach to the threaded ends of fasteners 364A-364D to immobilize fasteners 364A-364D. Thus, heater block 420 can slide on fasteners 364A-364D between heads of fasteners 364A-364D and compression plate 352, with springs 366A-366D providing biasing of heater block 420 away from compression plate 352. The spring-loaded action of heater block 420 can provide an ejection force to reaction vessel 205 to prevent sticking of reaction vessel 205 to thermal cycling heat block 310.

Heating elements 422A and 422B can comprise cartridge heaters, such as resistive heaters, that can be inserted into bores in heater block 420. Output of heating elements 422A and 422B can be monitored by a thermistor. Heating elements 422A and 422B and the thermistor can be connected to power board 360 to facilitate control and operation of thermo cycler system 208. As mentioned, heating elements 422A and 422B can provide one of three heating zones for reaction vessel 205, particularly configured to heat the upper portion of liquid containers of reaction vessel 205. Additionally, heating elements 422A and 422B can be used to prevent condensation formation when, for example, only lower chamber 384 is being used.

FIG. 16A is a cross-sectional view of thermal cycler module 304 of FIG. 4 with heated lid 302 partially open. Heater platen 314, or a seal positioned there-against, can engage and push again the top of reaction vessel 205. Reaction vessel 205 is also being pushed out of thermal cycler heat block 310 via springs 366A-366D. Seal carrier springs 336A and 336B can be uncompressed. FIG. 16A can depict thermal cycler module 304 just before closing of heated lid 302, or just after opening of heated lid 302 where springs 366A-366D are being used to eject reaction vessel 205.

FIG. 16B is a cross-sectional view of thermal cycler module 304 of FIG. 4 with heated lid 302 fully closed. Heated lid 302 is illustrated in a fully down position. Heater platen 314 can push down on reaction vessel 205 to push reaction vessel 205 down into thermal cycler heat block 310, thereby compressing springs 366A-366D and springs 336A and 336B. In the closed state of FIG. 16B, thermo cycler module 208 can provide incubation for long periods of time, such as between 4° C. and 70° C. for periods of minutes to hours, and thermo cycler module 208 can provide thermo-cycling for short periods of time between 55° C. and 98° C. for periods of seconds to minutes.

Figure 17:
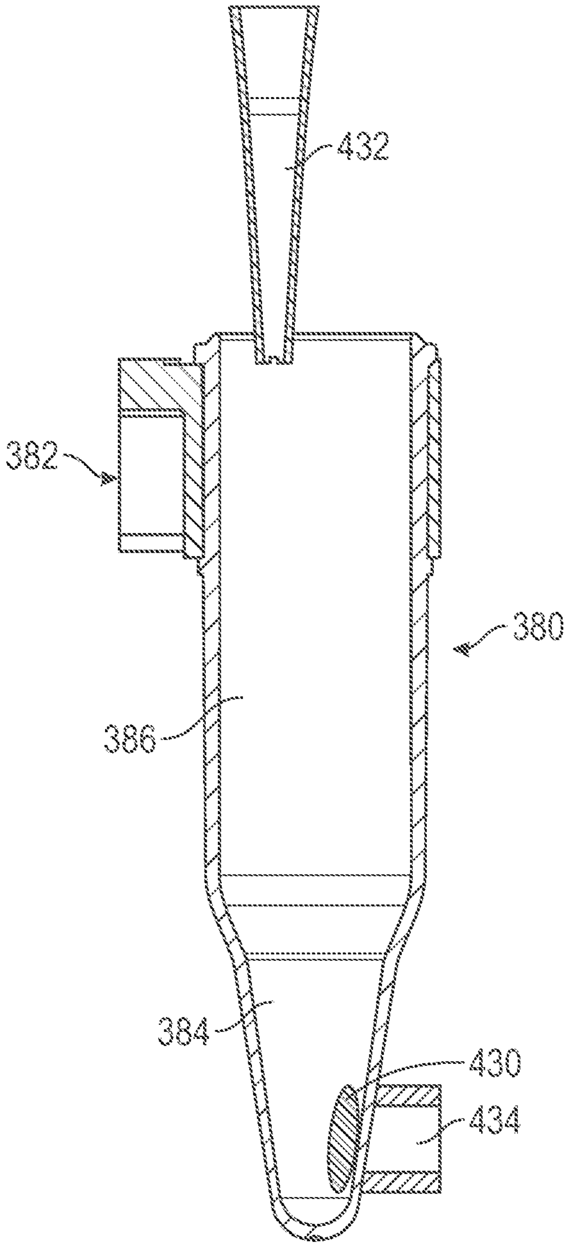
FIG. 17 is a cross-sectional view of a vessel of the reaction vessel of FIGS. 9-11 showing a magnet and a pipette tip.

FIG. 17 is a cross-sectional view of vessel 380 of reaction vessel 205 of FIGS. 9-11 showing a magnet 430 and pipette tip 432. Vessel can extend from frame 382. Pipette tip 432 can extend into upper chamber 386 to deposit liquid into vessel 380. Magnet 430 can be located in lower chamber 384. Probe 434, such as a metallic rod, can be pushed against vessel 380 to cause movement of magnet 430, such as to one side of lower chamber 384.

EXAMPLES

The embodiments described herein can be better understood by reference to the following, non-limiting examples which are offered by way of illustration. One of several advantages of the methods described herein is that one can perform large volume dilutions in a reaction vessel without having to transfer to a different labware type. Another of several advantages of the methods described herein is that one can pool samples within the same reaction vessel used for other process steps in, e.g., advance sequencing, during library preparation or at the end of library preparation. Pooling post-run would normally exceed the plate volume of a PCR plate. But the reaction vessels described herein have a large volume combined lower/upper chamber reaction vessel, such that one can pool samples in the same reaction vessel and avoid a plate transfer.

Example 1: Use of Large-Volume Reaction Vessels in PCR and Post-PCR Clean-Up Using Nucleic-Acid-Binding Magnetic Beads to Eliminate the Need for Using Traditional PCR Plates This example is meant to show, among other things, that the reaction vessels and systems described herein make it unnecessary to use traditional PCR plates in PCR and bead-based post-PCR clean-up reactions. And the added benefit of using the systems and reaction vessels described herein is a significant reduction in well-to-well contamination, since liquid is at a lower level and, as a result, there is little to no splashing. Furthermore, reducing the number of plate transfers reduces losses associated with liquid retention in the transferred-from plates Normalization of Nucleic Acids In some known devices and kits, the first step is to normalize the input DNA to 0.2 ng/μL. The nucleic acid purification concentrations going into such kits can vary widely. The first step in the process is to dilute the samples to 0.2 ng/μL. This may result in very large dilution volumes depending on the starting concentration of the material. Dilution of a sample from 10 ng/μL to 0.2 ng/μL does not require a large dilution prior to starting (5 μL stock DNA at a concentration of 10 ng/μL DNA and 245 μL Tris-Cl buffer). However, if the same sample begins at 30 ng/μL, the dilution volume would be much larger and not be able to be accommodated in a single well of a standard microplate (5 μL Stock DNA at 30 ng/μL, 745 μL Tris-Cl). Having a larger volume capacity, such as in the reaction vessels (e.g., reaction vessel 205) described herein, allows the robotic liquid handler described herein to begin library preparation without an intermediate step through a series of dilutions.

Fragmentation/Tagging

The reaction vessel is first chilled in the thermal cycler module 304 described herein. Chilling the components (e.g., DNA, tagging reagent, and enzymes added to fragment DNA) allows the system to reduce enzymatic activity of a tagging reagent until all reagents have been added. Once all additions have been dispensed and mixed, the thermal cycler module immediately heats to 55° C., which is a temperature where an added enzyme actively fragments the DNA. The thermal cycler module heats and cools the lower section of the reaction vessel as described herein using the Peltier device (e.g., heating elements 350A and 350B) targeted specifically at the bottom cone section of the reaction vessel (e.g., lower chamber 384). The reaction vessel can then be cooled to 10° C. Once the reaction vessel is cooled to 10° C., the reaction vessel lid 302 will open and a neutralizing reagent will stop the fragmentation process.

Polymerase Chain Reaction (PCR)

The next step in the process is the amplification of the library fragments and addition of adapters that are unique to each sample. Two adapters or primers and a master mix are added and the reaction vessel is returned to the thermal cycler module for PCR, using the lower section of the thermal cycler module.

After amplification, the amplified PCR products are isolated or "cleaned up" using magnetic beads, such as Ampure XP beads available from Beckman Coulter, Brea, Calif. The sample volume prior to addition is 50 μL. In known devices, the sample contents are typically transferred to a deep-well plate or storage plate for further processing. The reaction vessels described herein, however, obviate the need for such a transfer. Known PCR plates do not have enough volume capacity to process the plates through a traditional clean-up process. But the system described herein can accommodate the addition of, e.g., 30 μL of beads to each sample and mixes, such as by using upper chambers 386 of reaction vessels 205. After incubation, the samples are washed with several cycles of 200 μL 80% Ethanol. The samples are resuspended in 52.5 pt resuspension buffer (e.g., Tris-Cl or an elution buffer), and 50 pt of that volume is transferred to a new reaction vessel. The samples are evaluated offline (QC step) before proceeding to the Bead Based Normalization section of the protocol described herein.

Bead-Based Normalization

In known systems, the user is instructed to aliquot 20 μL of the sample to a new deep well plate or storage plate. But in the system described herein, a new reaction vessel is used for this step. And because there is available volume in the reaction vessel, there is no need to use a larger volume plate. The system will continue with that plate until the very end of the procedure, where it will transfer the single stranded sample to a new plate to be pooled for sequencing.

The use of the reaction vessels described herein will eliminate the use of a consumable plate that would be needed if reaction vessels and systems such as those described herein were unavailable.

Example 2: Use of Heating Large Volumes in Thermo Cycler Module for Stringent Washes with 2 Zone Heating Buffer Preparation and Hybridization Starting with previously-constructed DNA libraries, the first step in the protocol is a 4 hour hybridization in a 17 μL volume. After this step, a series of heated washes are performed using buffers. The volume capacity of the reaction vessels described herein allows for the system to place aliquots of reagents in the same well due to the increased heated well capacity (e.g., lower chamber 384 plus upper chamber 386). In so doing, Wash Buffer 1 can go in a total of 8 reaction vessels, and the stringent wash buffers can go in the remaining 16 reaction vessels out of a total of 24 reaction vessels. This will be done in the heated storage position on deck 105, not the thermal cycler module. The thermal cycler position will be utilized by the sample reaction vessel. The first wash buffer is added to the hybridization volume and bead volume. The total volume here is approximately 134 μL. This volume exceeds the volume of the thermo cycler capability (100 μL). The thermal cycler module has two different heating elements (e.g., heating elements 350A and 350B and heading elements 422A and 422B) not counting heater platen 314 of heated lid 302. The lower section of the reaction vessel works with thermal cycler module 304 to provide standard thermal cycling. The upper section works with thermal cycler module 304 to provide incubation heating up to 800 μL. At this point both the upper and lower sections of the thermal cycler will be set to 65° C. These washes are sensitive to temperature changes. The first wash is 45 minutes. The second wash is a 150 μL total volume reaction, which again utilizes both sections of the thermal cycler module. In a standard PCR plate, the sample volume would be close to the top. In the reaction vessels described herein, however, it is nowhere near the top, which decreases the possibility of cross-contamination during mixing. Another 150 μL heated wash follows this step. Then, the reaction is then cycled through a series of three 150 μL room temperature washes.

Polymerase Chain Reaction and Clean-Up

After all of the washes have been completed, the system described herein sets up a PCR reaction. The PCR reaction occurs in the thermal cycler module using primarily the bottom portion of the heating elements 350 and 350B with the upper portion and lid being heated to prevent condensation. Then, the samples are cleaned up using a cleanup protocol including placing the reaction vessel directly on a bar magnet (e.g., magnet 430) that will suspend the magnetic bead 4 mm above the bottom of the reaction vessel. This will aid in drying the beads prior to resuspension of samples in a suitable buffer to move forward with the next step. By controlling all aspects of the manufacture of the reaction vessels described herein, one can ensure that the bead pellet is approximately in the same spot. This is especially important if the elution volumes are very low, such as is case with NEBNext® Ultra™ II RNA Kits available from New England Biolabs® Inc., Ipswich, Mass., where the sample is eluted in 7 μL total volume.

The use of the reaction vessels described herein allow for increased volumes to be used for reagent storage and for better temperature control at high volumes in the thermal cycler module.

Example 3: Use of Heating Large Volumes in Thermo Cycler Module with 2 Zone Heating Double-stranded library fragments and ambient temperature oligo probes can be added to lower chamber 384 of reaction vessel 205 at ambient temperature.

Thermal cycling module 304 can be operated to heat lower chamber 384, using heating elements 350A and 350B for example, to a high temperature to denature the library fragments into single-stranded library fragments. Thermal cycling module 304 can additionally be operated to heat upper chamber 386, using heating elements 422A and 422B for example, to a temperature above that which lower chamber 384 is being heated to.

Thermal cycling module 304 can then be operated to slowly ramp down the temperature in lower chamber 384 to allow the oligo probes to bind to the single-stranded library fragments while upper chamber 386 is held above the temperature of lower chamber 384.

Thermal cycling module 304 can then be operated to hold at a constant temperature to ensure stabilization of the probe-library fragment complex while both lower chamber 384 and upper chamber 386 of thermal cycling module 304 hold at the same temperature.

A large volume of streptavidin beads can be added to the hybridized probe-library fragment complex. The total volume of the hybridized library and the streptavidin beads can exceed the volume of lower chamber 384. By holding upper chamber 386 and lower chamber 384 at the same temperature, the reaction temperature for the entire volume is maintained at the correct temperature.

EXEMPLARY EMBODIMENTS

1. A method of preparing a biological sample using a robotic liquid handler having an automated thermo cycler, the method comprising: isolating, using the robotic liquid handler, a nucleic acid from the sample in a first volume of liquid in a reaction vessel having a thicker-walled upper section and a thinner-walled lower section, wherein the first volume of liquid encompasses the thicker-walled upper section and the thinner-walled lower section of the reaction vessel; and amplifying, using the thermo cycler of the robotic liquid handler, the isolated nucleic acid in a second volume of liquid in the same reaction vessel, wherein the second volume of liquid encompasses the thinner-walled lower section but not the thicker-walled upper section of the reaction vessel.

2. The method of claim 1, wherein isolating the nucleic acid comprises diluting the nucleic acid to increase a volume of the biological sample to fill the lower section and at least partially fill the upper section.

3. The method of claim 2, further comprising: chilling the biological sample using the thermo cycler; and adding reagents to the biological sample.

4. The method of claim 3, further comprising heating the biological sample in the lower chamber using a lower heating element of the thermo cycler proximate the lower section.

5. The method of claim 1, wherein amplifying the isolated nucleic acid comprises: adding adapters and a master mix to the biological sample in the lower section; and thermocycle heating the lower section using a lower heating element of the thermo cycler proximate the lower section.

6. The method of claim 5, wherein amplifying the isolated nucleic acid further comprises: adding beads to the reaction vessel to mix the isolated nucleic acid; and washing the isolated nucleic acid using ethanol to increase a volume of the biological sample to fill the lower section and at least partially fill the upper section.

7. The method of claim 6, further comprising incubating the biological sample acid in the lower section and the upper section using the lower heating element and an upper heating element proximate the upper section.

8. A multi-step method of preparing a biological sample using a robotic liquid handler having an automated thermo cycler, the automated thermo cycler including a lower temperature-controlled zone and an upper temperature-controlled zone, the method comprising: incubating the biological sample at a constant temperature in a liquid volume encompassing the lower temperature-controlled zone and the upper temperature-controlled zone of the automated thermo cycler in a first step of the multi-step method; and thermocycling the biological sample in the lower temperature-controlled zone of the automated thermo cycler in a second step of the multi-step method.

9. The multi-step method of claim 8, wherein: the lower temperature-controlled zone is adapted for rapid thermocycling; and the upper temperature-controlled zone is adapted for fixed-temperature incubations.

10. The multi-step method of claim 8, further comprising placing the biological sample in a reaction vessel comprising: a lower chamber comprising a first volume and a first wall thickness; and an upper chamber comprising a second volume and a second wall thickness, the upper chamber being an extension of the lower chamber.

11. The multi-step method of claim 10, wherein: the second volume is greater than the first volume; the second wall thickness is greater than the first wall thickness; the upper chamber holds about 1 ml; and the bottom chamber holds about 100 μL.

12. The multi-step method of claim 10, further comprising: preventing condensation in the upper chamber using a lid heating zone of the thermo cycler.

13. The multi-step method of claim 10, further comprising: ejecting the reaction vessel from the thermo cycler using a spring-loaded ejection apparatus.

14. A method of preparing a biological sample located in a multi-chamber reaction vessel using a robotic liquid handler having a multi-zone thermo cycler, the method comprising: loading the biological sample into a lower chamber of the reaction vessel; heating the lower chamber of the reaction vessel using a lower heating zone of the thermo cycler; combining an additive into the biological sample to produce a combination filling the lower chamber and extending at least partially into an upper chamber of the reaction vessel; and heating the upper and lower chambers using the lower heating zone of the thermo cycler and an upper heating zone of the thermo cycler.

15. The method of claim 14, further comprising: heating a top of the upper chamber using a lid heating zone of the thermo cycler.

16. The method of claim 14, wherein heating the lower chamber of the reaction vessel using the lower heating zone of the thermo cycler comprises thermocycling the biological sample between upper and lower temperatures.

17. The method of claim 16, wherein heating the lower chamber of the reaction vessel using the lower heating zone of the thermo cycler further comprises activating a Peltier device in a heater block located below the lower chamber.

18. The method of claim 14, wherein heating the upper chamber of the reaction vessel using the upper heating zone of the thermo cycler comprises incubating the combination at an elevated temperature above ambient temperature.

19. The method of claim 18, wherein heating the upper chamber of the reaction vessel using the upper heating zone of the thermo cycler further comprises activating a resistance heater located in a heater block disposed alongside the upper chamber.

20. The method of claim 14, wherein heating the upper and lower chambers using the lower heating zone of the thermo cycler and an upper heating zone of the thermo cycler comprises: conducting heat from the lower heating zone through a first wall of the reaction vessel defining the lower chamber; and conducting heat from the upper heating zone through a second wall of the reaction vessel defining the upper chamber; wherein the second wall is thicker than the first wall.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of preparing a biological sample using a robotic liquid handler having an automated thermo cycler, the method comprising:

amplifying, using the thermo cycler of the robotic liquid handler, a nucleic acid isolated from the biological sample in a first volume of liquid in a first reaction vessel of a first type of reaction vessel including an upper section having a larger volume than a lower section of the first type of reaction vessel and the lower section having a smaller volume than the upper section, wherein the first volume of liquid encompasses the smaller-volume lower section but not the larger-volume upper section of the first reaction vessel of the first type of reaction vessel, wherein amplifying the nucleic acid isolated from the biological sample further comprises:

adding adapters to the nucleic acid isolated from the biological sample in the lower section; and incubating the lower section using a lower heating element of the thermo cycler proximate the lower section; and isolating, using the robotic liquid handler, the amplified nucleic acid in a second volume of liquid in the first reaction vessel of the first type of reaction vessel, wherein the second volume of liquid encompasses the larger-volume upper section and the smaller-volume lower section of the reaction vessel, wherein isolating the amplified nucleic acid further comprises:

adding beads to the amplified nucleic acid to increase specificity of targeted nucleic acid;

washing the amplified nucleic acid using ethanol to increase a volume of the amplified nucleic acid to fill the lower section and at least partially fill the upper section; and incubating the amplified nucleic acid in the lower section and the upper section using the lower heating element and an upper heating element proximate the upper section.

2. The method of claim 1, further comprising performing a fragmentation reaction on the nucleic acid from the biological sample in a second reaction vessel of the first type of reaction vessel using the robotic liquid handler.

3. The method of claim 1, further comprising performing an adapter-ligation reaction on the nucleic acid from the biological sample in the first reaction vessel using the robotic liquid handler.

4. The method of claim 1, further comprising:

adding double-stranded library fragments and oligo probes to the lower section of the reaction vessel;

heating the lower section to a first temperature above ambient to denature the double- stranded library fragments into single-stranded library fragments;

heating the upper section of the reaction vessel to a second temperature above the first temperature;

reducing the first temperature to allow the oligo probes to bind to the single-stranded library fragments; and adding streptavidin beads to the reaction vessel such that a volume of liquid in the reaction vessel extends into the upper section of the reaction vessel.

5. The method of claim 1, wherein the larger volume of the upper section is greater than the smaller volume of the lower section, wherein the second volume is about 100 pl; and the first volume is about 900 pl.

6. The method of claim 1, wherein:

the larger-volume upper section has a first wall thickness;

the smaller-volume lower section has a second wall thickness; and the first wall thickness is greater than the second wall thickness.

7. The method of claim 1, further comprising:

isolating, using the robotic liquid handler, the nucleic acid from the biological sample in the first reaction vessel in which the nucleic acid was amplified.

8. The method of claim 7, further comprising:

chilling the nucleic acid isolated from the biological sample using the thermo cycler; and adding reagents to the biological sample.

9. The method of claim 7, further comprising heating the nucleic acid isolated from the biological sample in the lower section using a lower heating element of the thermo cycler proximate the lower section.

10. The method of claim 1, wherein the automated thermo cycler includes:

a lower temperature-controlled zone configured to control the temperature of the smaller-volume lower section of the first type of reaction vessel; and an upper temperature-controlled zone configured to control the temperature of the larger-volume upper section of the first type of reaction vessel.

11. The method of claim 10, wherein the lower temperature-controlled zone is adapted for rapid thermocycling; and the upper temperature-controlled zone is adapted for targeted-temperature incubations.

12. The method of claim 10, wherein the upper temperature-controlled zone of the automated thermo cycler comprises a heater located in a heater block disposed alongside the larger-volume upper section of the first reaction vessel to control the temperature of the larger-volume upper section.

13. A method of preparing a biological sample using a robotic liquid handler having an automated thermo cycler including a lower temperature-controlled zone configured to control the temperature of a lower section of a first type of reaction vessel having a smaller volume than an upper section of the first type of reaction vessel; and an upper temperature-controlled zone configured to control the temperature of the larger-volume upper section of the first type of reaction vessel, the method comprising:

amplifying, using the thermo cycler of the robotic liquid handler, a nucleic acid from the biological sample in a first volume of liquid in a first reaction vessel of a first type of reaction vessel including an upper section having a larger volume and a lower section having a smaller volume, wherein the first volume of liquid encompasses the smaller-volume lower section but not the larger-volume upper section of the first reaction vessel of the first type of reaction vessel; and isolating, using the robotic liquid handler, the amplified nucleic acid in a second volume of liquid in the first reaction vessel of the first type of reaction vessel, wherein the second volume of liquid encompasses the larger-volume upper section and the smaller-volume lower section of the reaction vessel.

14. The method of claim 13, wherein the lower temperature-controlled zone is adapted for rapid thermocycling; and the upper temperature-controlled zone is adapted for targeted-temperature incubations.

15. The method of claim 13, wherein the upper temperature-controlled zone of the automated thermo cycler comprises a heater located in a heater block disposed alongside the larger-volume upper section of the first reaction vessel to control the temperature of the larger-volume upper section.

16. A method of preparing a biological sample using a robotic liquid handler having an automated thermo cycler, the method comprising:

amplifying, using the thermo cycler of the robotic liquid handler, a nucleic acid from the biological sample in a first volume of liquid in a first reaction vessel of a first type of reaction vessel including an upper section having a larger volume than a lower section of the first type of reaction vessel, wherein the first volume of liquid encompasses the smaller-volume lower section but not the larger-volume upper section of the first reaction vessel of the first type of reaction vessel;

isolating, using the robotic liquid handler, the amplified nucleic acid in a second volume of liquid in the first reaction vessel of the first type of reaction vessel, wherein the second volume of liquid encompasses the larger-volume upper section and the smaller-volume lower section of the reaction vessel;

adding double-stranded library fragments and oligo probes to the lower section of the reaction vessel;

heating the lower section to a first temperature above ambient to denature the double-stranded library fragments into single-stranded library fragments;

heating the upper section of the reaction vessel to a second temperature above the first temperature;

reducing the first temperature to allow the oligo probes to bind to the single-stranded library fragments; and adding streptavidin beads to the reaction vessel such that a volume of liquid in the reaction vessel extends into the upper section of the reaction vessel.

* * * * *